US009547266B2

(12) United States Patent
Nihei

(10) Patent No.: US 9,547,266 B2
(45) Date of Patent: Jan. 17, 2017

(54) IMAGE FORMING APPARATUS CONTROLLING TIMING OF SWITCHING BETWEEN IMAGE FORMATION MODES

(71) Applicant: CANON KABUSHIKI KAISHA, Tokyo (JP)

(72) Inventor: Hironobu Nihei, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/734,621

(22) Filed: Jun. 9, 2015

(65) Prior Publication Data

US 2015/0363677 A1 Dec. 17, 2015

(30) Foreign Application Priority Data

Jun. 16, 2014 (JP) ................................ 2014-123570
Apr. 1, 2015 (JP) ................................ 2015-075032

(51) Int. Cl.
*G06K 15/02* (2006.01)
*G06K 15/16* (2006.01)
*G03G 15/23* (2006.01)
*G03G 15/01* (2006.01)

(52) U.S. Cl.
CPC ........ *G03G 15/234* (2013.01); *G03G 15/0131* (2013.01); *G03G 15/0189* (2013.01); *G03G 15/0136* (2013.01); *G03G 2221/1657* (2013.01)

(58) Field of Classification Search
None
See application file for complete search history.

(56) References Cited

U.S. PATENT DOCUMENTS 6,636,711 B1 * 10/2003 Katahira ................ G03G 15/01 399/299
8,891,988 B2 11/2014 Takahashi et al.
2003/0164971 A1 * 9/2003 Kidani ..................... H04N 1/46 358/1.13
2004/0090644 A1 * 5/2004 Nishikawa ............ G06F 3/1204 358/1.13
2004/0136754 A1 * 7/2004 Yamamoto ......... G03G 15/0194 399/223

(Continued)

FOREIGN PATENT DOCUMENTS

JP 2003-262999 A 9/2003
JP 2008-116906 A 5/2008
JP 2013-101197 A 5/2013

*Primary Examiner* — Thomas D Lee
(74) *Attorney, Agent, or Firm* — Fitzpatrick, Cella, Harper & Scinto

(57) ABSTRACT

The motor that drives a reverse unit, and a CPU configured to switch an image formation mode between a full color mode for forming an image using image forming stations and a black and white mode for forming an image using the image forming station are provided. If the image is formed on a first recording material supplied by a sheet feeding roller pair and subsequently an image is formed on a second recording material supplied by a sheet refeeding unit, the motor continuously drives the reverse unit. If the image formation mode for the first recording material is different from the image formation mode for the second recording material, the CPU switches the image formation mode to the full color mode, and forms the images on the first recording material and the second recording material.

23 Claims, 17 Drawing Sheets

(56) References Cited

U.S. PATENT DOCUMENTS

| | | | | |
|---|---|---|---|---|
| 2004/0155952 | A1* | 8/2004 | Sato | H04N 1/46 347/232 |
| 2004/0175209 | A1* | 9/2004 | Sato | G03G 15/1625 399/309 |
| 2008/0106751 | A1 | 5/2008 | Kobashigawa | |
| 2011/0157613 | A1* | 6/2011 | Miyahara | G03G 15/0194 358/1.9 |
| 2011/0158666 | A1* | 6/2011 | Furukawa | G03G 15/0194 399/46 |

* cited by examiner

IMAGE FORMING APPARATUS CONTROLLING TIMING OF SWITCHING BETWEEN IMAGE FORMATION MODES

BACKGROUND OF THE INVENTION

Field of the Invention

The present invention relates to image forming apparatuses, such as a copier and a laser printer, and in particular to printing mode switching control for double-sided printing in a color image forming apparatus.

Description of the Related Art

Conventionally, an electrophotographic color image forming apparatus has a mode capable of multi-color image forming (e.g., full color mode) and a mode capable of single color image forming (e.g., black and white mode). The two modes are configured to be switchable. Switching the mode every time when a user designates a color image forming apparatus to print a job mixedly including a full color image and a black and white image reduces productivity owing to downtime for mode switching. If all images including black and white images are printed in the full color mode, the operating lives of consumable items other than of black are unnecessarily reduced. Thus, an image forming apparatus has been proposed that optimizes mode switching timing according to the total number of sheets for a job and the number of black and white image sheets included in the job.

For example, Japanese Patent Application Laid-Open No. 2008-116906 discloses a method of determining mode switching timing based on the total number of pages for a job, the number of printed pages, and a mode switching threshold stored in an image forming apparatus, for processing a job mixedly including a black and white image and a full color image. According to Japanese Patent Application Laid-Open No. 2008-116906, the image forming apparatus is switched from the full color mode to the black and white mode if the number of remaining pages for a job exceeds the switching threshold, and printing is performed, thereby reducing the number of times for switching to the black and white mode and optimizing the total print time period. Likewise, Japanese Patent Application Laid-Open No. 2003-262999 also discloses a method of determining mode switching timing for a job mixedly including a black and white image and a full color image. According to Japanese Patent Application Laid-Open No. 2003-262999, mode switching from the full color mode to the black and white mode is executed if images of a job designated by a user indicate that a predetermined number of black and white images are consecutively arranged, and the black and white images are formed. On the contrary, if the number of black and white images is less than the number of predetermined sheets, the black and white images are formed, with the mode being left in the full color mode without mode switching. Thus, the frequency of execution of mode switching is optimized. That is, the productivity and the operating lives of consumable items are optimized.

In recent years, in view of savings in resources and energy, image forming apparatuses standardly having an automatic double-sided printing function have increasingly been installed. Meanwhile, both requirements of reduction in costs of image forming apparatuses and improvement in productivity of double-sided printing have been required to be met. For example, to achieve reduction in cost, there is a configuration that includes a driving source for a reverse mechanism embedded in an image forming apparatus to revert the front and back of a recording sheet, the driving source being shared with a fixing device, and omits a clutch for transmitting a driving force to the reverse mechanism. If this configuration executes a job of double-sided printing mixedly including a black and white image and a full color image, the mode cannot be switched according to an order in some cases. That is, situations occur where a recording sheet cannot be temporarily under stand-by in the reverse mechanism due to mode switching. To temporarily cause a recording sheet to stand by in the reverse mechanism, all operations related to the fixing device are also required to be temporarily stopped. Typically, returning operations related to the fixing device require a certain period after transmission of a driving force. Consequently, during the returning operations, the driving force is transmitted also to the reverse mechanism that shares the same driving source with the fixing device because the clutch is omitted. The recording sheet standing by in the reverse mechanism is thus conveyed to the reverse path, and collides with another recording sheet standing by on the reverse path, thereby causing printing failure.

If the image forming apparatus having the above configuration executes a job mixedly including a black and white image and a full color image entirely in the full color mode, no mode switching is required. Consequently, no printing failure occurs. However, if image forming is continued in the full color mode even for the black and white image, the operating lives of consumable items that are other than items for black and are not originally used for this image forming are reduced. This reduction is unfavorable for the user. It is thus an object to allow the image forming apparatus including the aforementioned cost-reduced reverse mechanism to execute mode switching at an appropriate timing in execution of a job mixedly including the black and white mode and the full color mode, without causing printing failure.

SUMMARY OF THE INVENTION

The present invention has been made in such situations, and has an object to execute mode switching during execution of a double-sided printing job mixedly including multiple image formation modes so as to cause no printing failure and alleviate reduction in operating lives of consumable items.

To achieve the above object, the present invention has the following configuration.

(1) An image forming apparatus includes a plurality of image forming units that forms an image on an image bearing member, a transfer unit that transfers the image formed on the image bearing member onto a recording material, a fixing unit that fixes the transferred image onto the recording material onto which the image has been transferred by the transfer unit, a containing unit that contains the recording material, a first supplying unit that supplies the recording material contained in the containing unit to the transfer unit, a reverse unit that reverses the recording material onto which the image has been fixed by the fixing unit, and conveys the recording material to a conveyance path communicating with the transfer unit, a second supplying unit that supplies the recording material conveyed to the conveyance path by the reverse unit to the transfer unit, a driving unit that drives the reverse unit; and a control unit that can switch an image formation mode between a first mode in which a first image forming unit and a second image forming unit different from the first image forming unit among the image forming units are used to form the image, and a second mode in which the second image forming unit is used for forming the image without using the first image forming unit, wherein if an image is formed on a first recording material supplied by the first supplying unit and subsequently an image is formed on a second recording material that is different from the first recording material and supplied by the second supplying unit, the driving unit continuously drives the reverse unit, and, if the image formation mode for the first recording material is different from the image formation mode for the second recording material, the control unit forms the images on the first recording material and the second recording material in the first mode.

Further features of the present invention will become apparent from the following description of exemplary embodiments with reference to the attached drawings.

DESCRIPTION OF THE EMBODIMENTS

Preferred Embodiments of the Present Invention will now be described in detail in accordance with the accompanying drawings.

Embodiment 1

Overview of Image Forming Apparatus

Figure 1:
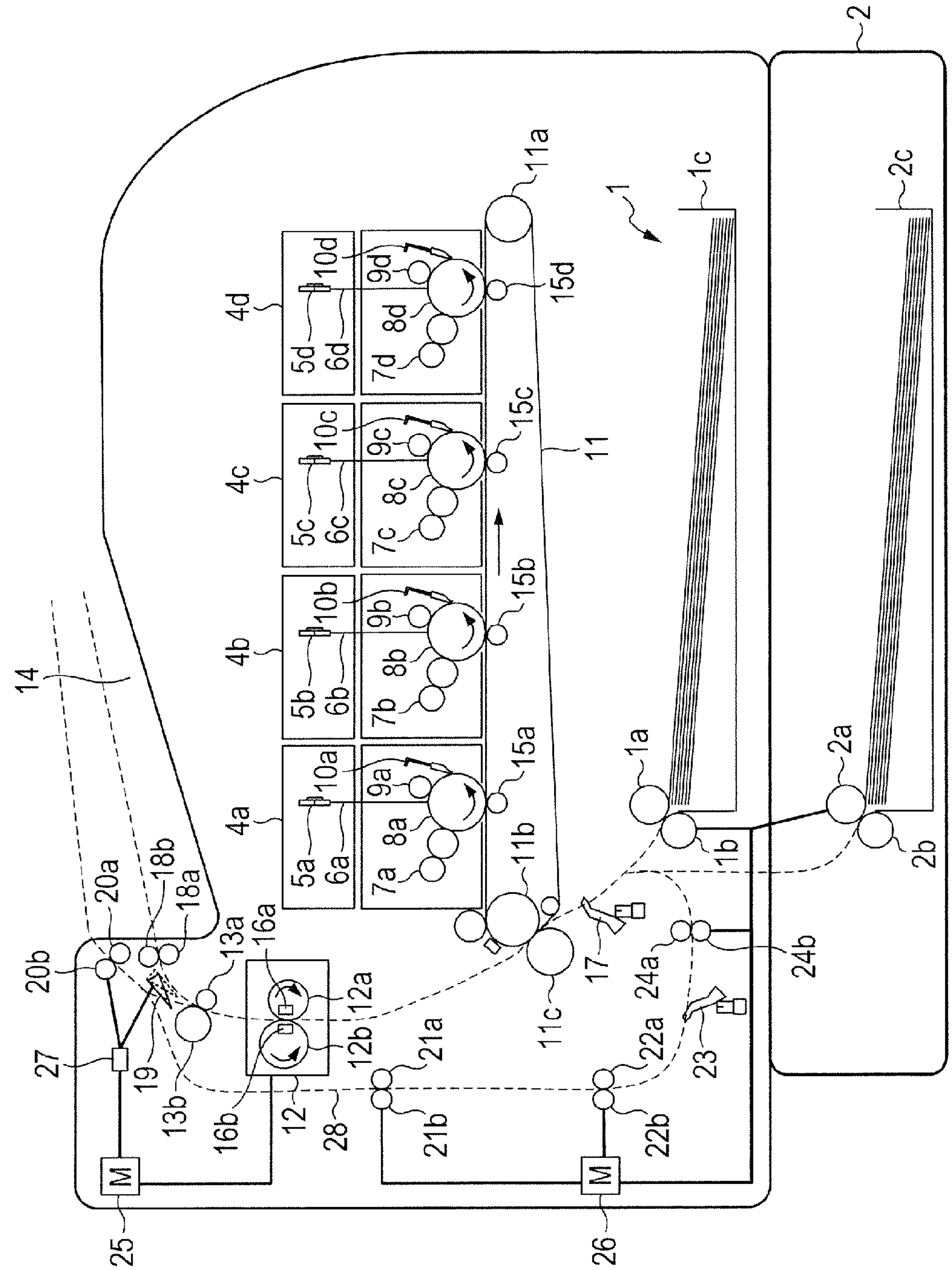
FIG. 1 illustrates a schematic configuration diagram of an image forming apparatus of each of Embodiments 1 to 3.

Referring to FIG. 1, an overall configuration of a laser printer is described as an example of image forming apparatus of Embodiment 1. The image forming apparatus illustrated in FIG. 1 includes four image forming stations 4*a*, 4*b*, 4*c* and 4*d*. FIG. 1 illustrates, from the left, the image forming stations having yellow (Y), magenta (M), cyan (C) and black (K) toner. Suffixes "a", "b", "c" and "d" of symbols in the diagram means yellow (Y), magenta (M), cyan (C) and black (K), respectively. The image forming stations 4*a* to 4*d* have the same configuration. In the following description, the suffixes "a" to "d" are not added if not specifically required. The image forming apparatus illustrated in FIG. 1 can form a full color image or a black and white image on a recording material. Here, the recording material may be, for example, a recording sheet, an OHP sheet, or cloth. Hereinafter, in this embodiment, the case of forming an image on the recording sheet is described.

(Image Forming Unit)

An image forming unit includes a scanning optical unit 5, a photosensitive drum 8, a charger 9, a developing roller 7 and a cleaning device 10. The photosensitive drum 8, which is an image bearing member, has a configuration including an aluminum cylinder and an organic photoconductive layer applied to an outer peripheral surface of the cylinder. This drum is arranged to be rotatable in the direction of an arrow (counterclockwise direction) by a driving force of a driving source, not illustrated. Around the photosensitive drum 8, a charger 9, a scanning optical unit 5, a developing roller 7, a primary transfer roller 15 and a cleaning device 10 are arranged. The charger 9 uniformly charges a surface of the photosensitive drum 8. The scanning optical unit 5 guides light generated based on an image signal to an optical path 6, and irradiates the photosensitive drums 8 with the light. The developing roller 7 deposits toner onto electrostatic latent images formed on the surfaces of the photosensitive drums 8, and visualizes the images as yellow (Y), magenta (M), cyan (C) and black (K) toner images. The primary transfer roller 15 transfers the toner images on the photosensitive drums 8 (on the photosensitive drums) onto an intermediate transfer belt 11, which is an intermediate transferring member. The cleaning device 10 removes the toner that has not been transferred onto the intermediate transfer belt 11 and remains on the surface of the photosensitive drum 8. The developing roller 7 is driven by the driving source, not illustrated, and is configured to be contactable with and separable from the photosensitive drum 8 by a developing position switching solenoid, not illustrated. The cleaning device 10 removes the toner remaining on the photosensitive drum 8 described-above, or the toner remaining on the intermediate transfer belt 11 after the toner image formed on the intermediate transfer belt 11 has been transferred onto the recording sheet, and accumulates the toner in a cleaner container.

The intermediate transfer belt 11 extends around support rollers 11*a* and 11*b*, and is arranged to be in contact with the photosensitive drums 8. The intermediate transfer belt 11 is moved around in an arrow direction (clockwise direction) by the driving source, not illustrated. The primary transfer roller 15 transfers the toner image onto the photosensitive drum 8. As will be described later, the primary transfer rollers 15*a* to 15*c* except for the black primary transfer roller 15*d* is configured to be contactable with and separable from the intermediate transfer belt 11 by the driving force of the driving source, not illustrated, and the solenoid for switching the position of the primary transfer roller, not illustrated. The secondary transfer unit (also called a transfer unit) transfers the toner image on the intermediate transfer belt 11 onto the recording sheet while sandwiching and conveying the recording sheet. The secondary transfer unit is arranged so as to cause the transfer roller 11*c* to be in contact with the intermediate transfer belt 11, and so as to be at a position facing the support roller 11*b*.

(Sheet Feeding Unit)

The sheet feeding unit 1 includes a sheet feeding roller pair 1*a* and 1*b*, which is a first supplying unit for feeding the recording sheet stored in the sheet feeding cassette 1*c*. The sheet feeding cassette 1*c*, which is a containing unit, contains the recording sheet on which an image is to be formed. The recording sheet fed from the sheet feeding unit 1 passes through a resist sensor 17 and reaches the secondary transfer unit. A sheet feeding unit 2, which is an optional feeding device detachably attached to the main body of the image forming apparatus, includes a sheet feeding roller pair 2*a* and 2*b* for feeding the recording sheet contained in the sheet feeding cassette 2*c*, as with the case of the sheet feeding unit 1. The sheet feeding cassette 2*c*, which is a containing unit, stores the recording sheet on which an image is to be formed. The recording sheet fed by the sheet feeding roller pair 2*a* and 2*b* from the sheet feeding unit 2 attached to the bottom of the sheet feeding unit 1 passes through a part of conveyance path of the sheet feeding unit 1 and the resist sensor 17, and reaches the secondary transfer unit.

(Fixing Unit)

The fixing unit 12 includes a fixing roller 12*a* for heating the recording sheet, and a pressure roller 12*b* for pressing the recording sheet to the fixing roller 12*a*. The rollers are arranged so as to rotate in arrow directions by a motor 25, which is a driving source. The fixing roller 12*a* and the pressure roller 12*b* are hollowly formed, and internally incorporate heaters 16*a* and 16*b*. The recording sheet onto which the toner image has been transferred is conveyed by the fixing roller 12*a* and the pressure roller 12*b*, while application of heat and pressure to the recording sheet fixes the melted toner image onto the surface of the recording sheet. A discharge roller pair 13*a* and 13*b*, and a discharge roller pair 18*a* and 18*b* discharge the recording sheet onto which the toner image has been fixed, to a discharge unit 14.

(Reverse Unit)

A reverse unit reverses the conveyance direction of the recording sheet onto which the toner image has been fixed by the fixing unit 12. The reverse unit includes flapper 19 that changes the conveyance path of the recording sheet, and reverse rollers 20*a* and 20*b* that are configured to convey the recording sheet having been conveyed by the discharge roller pair 13*a* and 13*b* in a draw-in direction or the direction of a reverse path 28. The flapper 19 and the reverse rollers 20*a* and 20*b* are arranged to be driven by the motor 25, which is the same driving source shared with the fixing unit 12. A solenoid 27 is provided between the flapper 19, the reverse rollers 20*a* and 20*b* and the motor 25 as the driving unit. The solenoid 27 switches the position of the flapper 19, and the rotation direction of reverse rollers 20*a* and 20*b*. The solenoid 27 can switch the flapper 19 to a position indicated by a solid line in FIG. 1 or a position indicated by a broken line. The position of the flapper 19 and the rotation directions of the reverse rollers 20*a* and 20*b* are configured to cooperate with each other. When the position of the flapper 19 is at the position indicated by the broken line in FIG. 1, the reverse rollers 20*a* and 20*b* rotate in a direction of drawing the recording sheet into the reverse unit. On the contrary, when the position of the flapper 19 is at the position indicated by the solid line in FIG. 1, the reverse rollers 20*a* and 20*b* rotate in the directions of conveying the recording sheet to the reverse path 28.

(Sheet Refeeding Unit)

A sheet refeeding unit, which is a second supplying unit, temporarily stop conveying the recording sheet having been conveyed in the reverse path 28, and refeeds the recording sheet having temporarily been stopped being conveyed. When the sheet refeeding stand-by sensor 23 detects the recording sheet, the sheet refeeding unit stops a clutch for controlling supply of driving force by a motor 26, which is a driving source, to thereby stop driving of each conveyance roller pair. Subsequently, the clutch is operated until the resist sensor 17 detects the recording sheet such that the recording sheet passes a part of the conveyance path of the sheet feeding unit 1 and reaches the resist sensor 17 and the secondary transfer unit, and drives each of a conveyance roller pair. The reverse path is provided with a conveyance roller pair 21*a* and 21*b*, a conveyance roller pair 22*a* and 22*b*, a conveyance roller pair 24*a* and 24*b*, a clutch (not illustrated) that controls transmission of a driving force to each conveyance roller pair, and a sheet refeeding stand-by sensor 23. Each of the conveyance roller pairs 21*a*/21*b*, 22*a*/22*b*, and 24*a*/24*b* is driven by the motor 26 and the clutch for controlling supplying the driving force of the motor 26. The sheet feeding roller pair 1*a* and 1*b* of the sheet feeding unit 1, and the sheet feeding roller pair 2*a* and 2*b* of the sheet feeding unit 2 are driven by the motor 26 and the clutch for controlling supplying the driving force of the motor 26, as with the case of the conveyance roller pair.

[Mode Switching]

Figures 2A, 2B, 2C:
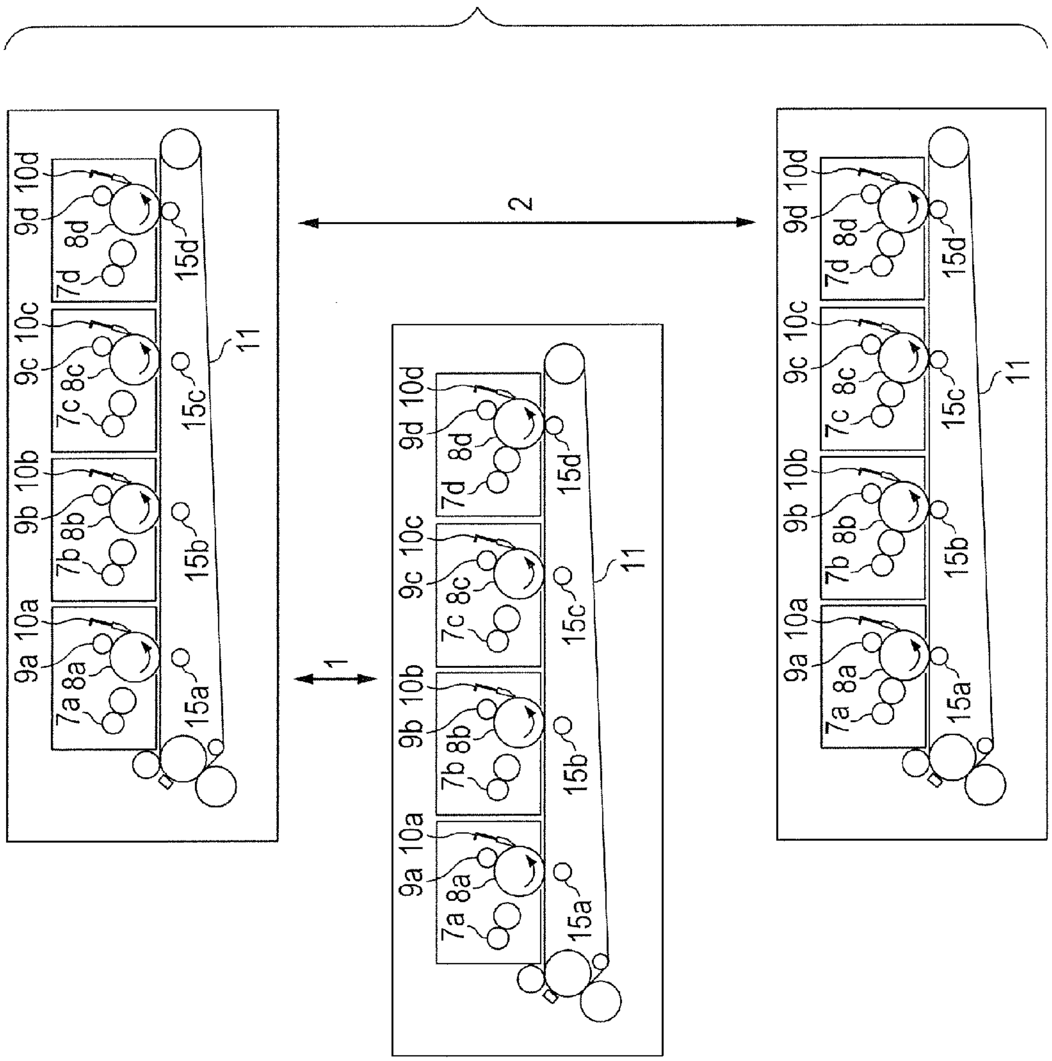
FIGS. 2A, 2B and 2C illustrate mode configurations of an image forming unit.

Next, a mode switching operation in the image forming unit according to this embodiment is described. The mode switching causes the mode of the image forming unit to transition to another mode, for example, transition from a full color mode capable of multi-color image forming to a black and white mode capable of single color image forming, or the black and white mode to the full color mode. FIGS. 2A, 2B and 2C are diagrams illustrating the positions of developing rollers 7*a* to 7*d* and primary transfer rollers 15*a* to 15*d* in each mode, and mode transition between the modes. The modes in this embodiment are three modes that are a detachment mode (FIG. 2A), the black and white mode as a second mode (FIG. 2B), and the full color mode as a first mode (FIG. 2C). In the detachment mode, all the developing rollers 7*a* to 7*d* are at positions without contact with the respective photosensitive drums 8*a* to 8*d*. The primary transfer rollers 15*a* to 15*c* are at positions without contact with the intermediate transfer belt 11. The primary transfer roller 15*d* is at a position in contact with the intermediate transfer belt 11. In the black and white mode, the developing rollers 7*a* to 7*c* of the image forming stations 4*a* to 4*c*, which are the first image forming units, are at positions without contact with the respective photosensitive drums 8*a* to 8*c*, and the developing roller 7*d* of the image forming station 4*d*, which is the second image forming unit, is at a position in contact with the photosensitive drum 8*d*. The primary transfer rollers 15*a* to 15*c* are at positions without contact with the respective intermediate transfer belt 11. The primary transfer roller 15*d* is at a position in contact with the intermediate transfer belt 11. In the full color mode, the developing rollers 7*a* to 7*d* are at positions in contact with the respective photosensitive drums 8*a* to 8*d*. The primary transfer rollers 15*a* to 15*d* are at positions in contact with the intermediate transfer belt 11.

In the full color mode, the developing roller 7*d* to be used in the black and white mode is in contact with the photosensitive drum 8*d*, and the primary transfer roller 15*d* is at the position in contact with the intermediate transfer belt 11. Consequently, a black single color image can also be formed. The mode transition between modes is performed in orders indicated by the arrows 1 and 2 in FIGS. 2A, 2B and 2C. That is, mode transition between the detachment mode and the full color mode, or mode transition between the detachment mode and the black and white mode is allowed in each direction. However, direct mode transition between the full color mode and the black and white mode is not allowed. Consequently, mode transition from the full color mode to the black and white mode, or from the black and white mode to the full color mode is necessarily by way of the detachment mode. For example, in the case of mode transition from the full color mode to the black and white mode, the timing of mode transition from the full color mode to the detachment mode is after completion of image forming by the image forming unit. That is, the timing is after completion of primary transfer of an image from each photosensitive drum onto the intermediate transferring member. The timing of mode transition from the detachment mode to the black and white mode is at the timing of completion of transfer onto the recording sheet by the secondary transfer unit. Also in the case of mode transition from the black and white mode to the full color mode, the mode transitions at a similar timing.

The reason of adoption of the above control is now described. In some cases, the image forming apparatus causes the same driving source to drive the developing rollers 7*a* to 7*d*, the photosensitive drums 8*a* to 8*d* and the intermediate transfer belt 11 to reduce cost. There is thus a possibility that mode switching during execution of the image forming operation causes variation in load occurring when the developing rollers 7*a* to 7*d* come into contact with the respective photosensitive drums 8*a* to 8*d* to affect the quality of an image that is to be formed. Consequently, in the case of mode transition from the full color mode to the black and white mode, stand-by is required until completion of the primary transfer or the secondary transfer as with the case of the above control. That is, mode switching requires a certain period.

[System Configuration of Image Forming Apparatus]

Figure 3A:
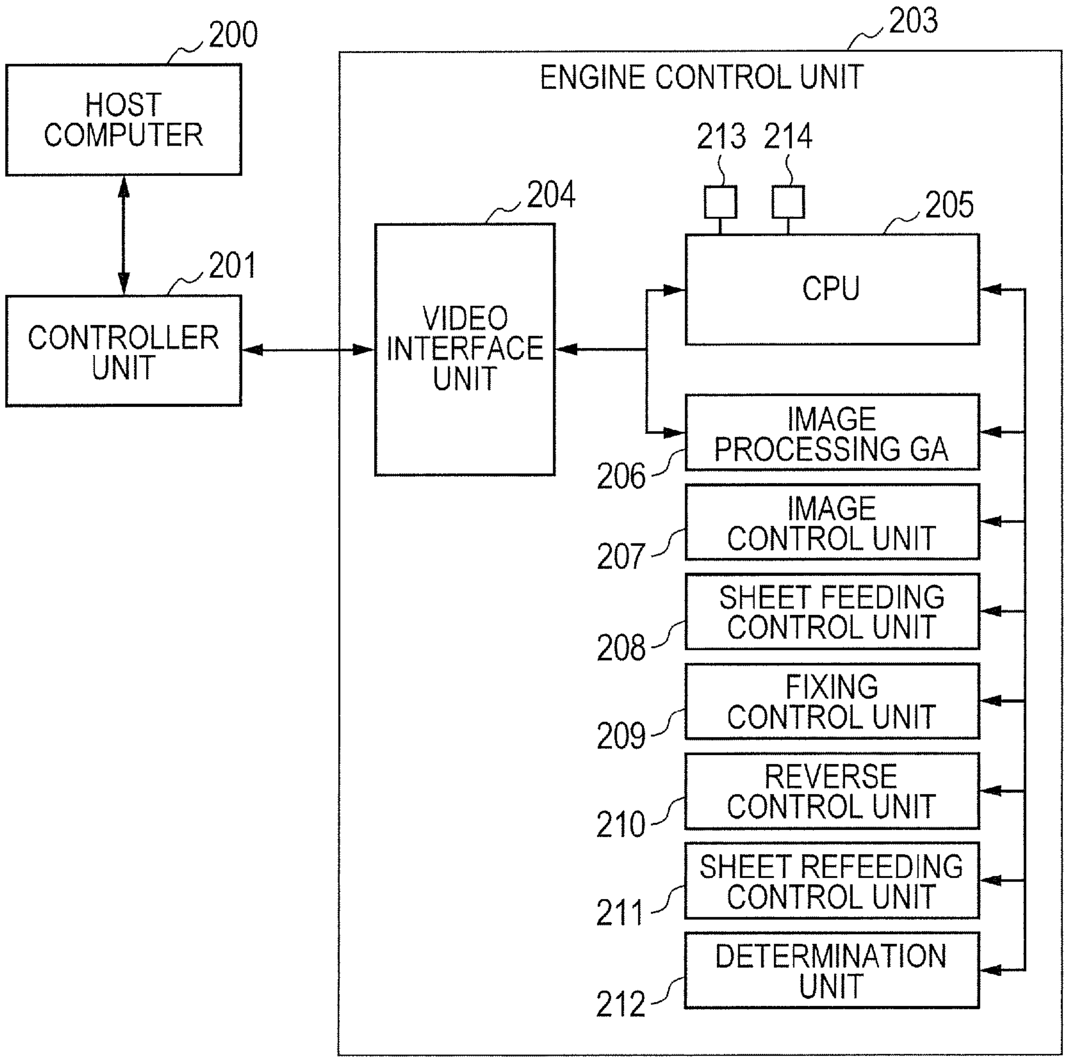
FIG. 3A illustrates a system configuration of each of Embodiments 1 to 3.

Next, the system configuration of the image forming apparatus is described. FIG. 3A is a block diagram for illustrating the overall configuration of the system of the image forming apparatus. In FIG. 3A, the image forming apparatus includes a controller unit 201 and an engine control unit 203. The controller unit 201 can mutually communicate with a host computer 200, which is an external apparatus, and with an engine control unit 203. The engine control unit 203 includes a video interface unit 204, a CPU 205, an image processing GA (gate array) 206, an image control unit 207, a fixing control unit 209, a sheet feeding control unit 208, a reverse control unit 210, a sheet refeeding control unit 211 and a determination unit 212. The video interface unit 204 relays a signal between the engine control unit 203 and the controller unit 201. The image control unit 207 controls the image forming unit described above. The fixing control unit 209 controls the fixing unit 12 described above. The sheet feeding control unit 208 controls the sheet feeding unit described above. The reverse control unit 210 controls the reverse unit described above. The sheet refeeding control unit 211 controls the sheet refeeding unit described above. The determination unit 212 determines whether mode transition is allowed or not based on the content of a print reservation instruction, which will be described later. The CPU 205 transmits and receives data, such as a command, to and from the controller unit 201. The CPU 205 includes a ROM 213 and a RAM 214, which are storing units. The ROM 213 stores a control program to be executed by the CPU 205 and data. The RAM 214 is a memory used by the control program executed by the CPU 205 for temporarily storing information. The image control unit 207 and the sheet feeding control unit 208 also include a CPU, a ROMs and a RAM, not illustrated. As with the case of the CPU 205, the ROM includes a control program and data, the RAM is used by the control program for temporarily storing information.

[Transmission and Reception of Information Between Controller Unit and Engine Control Unit]

Figure 3B:
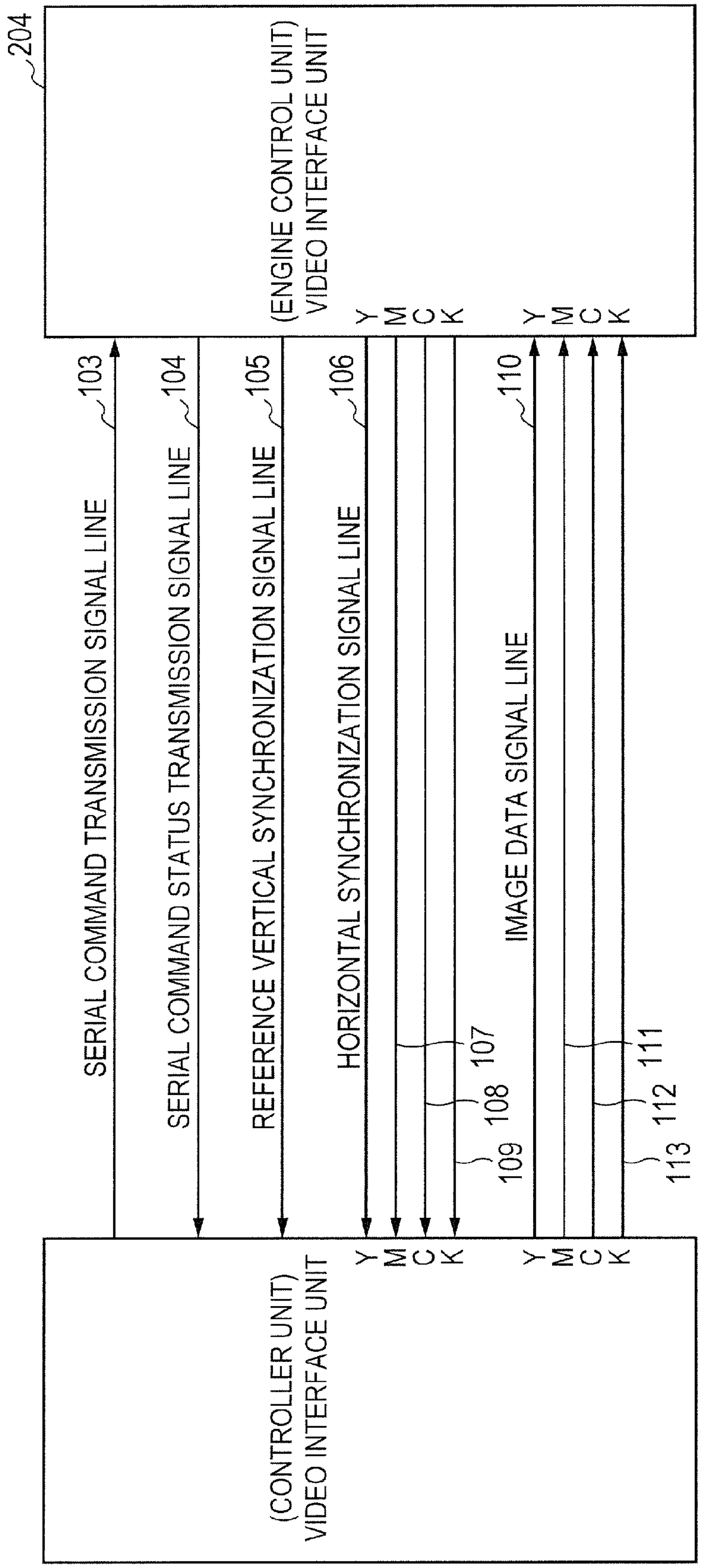
FIG. 3B illustrates an interface signal diagram between an engine control unit and a controller unit.

Next, transmission and reception of information between the controller unit 201 and the engine control unit 203 and the content of the information are described. FIG. 3B is a diagram illustrating interface signals between the video interface unit 204 of the engine control unit 203 and the video interface unit, not illustrated, of the controller unit 201. In FIG. 3B, a serial command transmission signal line 103 is a signal line for transmitting an instruction from the controller unit 201 to the engine control unit 203. A serial command status transmission signal line 104 is a signal line for transmitting status data by serial communication from the engine control unit 203 to the controller unit 201 in response to a command transmitted from the controller unit 201.

A reference vertical synchronization signal line 105 is a signal line for transmitting a /TOP signal, which is a reference vertical synchronization signal, from the engine control unit 203 to the controller unit 201. Signal lines 106 to 109 are for transmitting a horizontal synchronization signal from the engine control unit 203 to the controller unit 201. Yellow (Y), magenta (M), cyan (C) and black (K) horizontal synchronization signals are transmitted from the engine control unit 203 to the controller unit 201 through the respective horizontal synchronization signal line 106 to 109. Signal lines 110 to 113 are for transmitting image data signals from the controller unit 201 to the engine control unit 203. Yellow (Y), magenta (M), cyan (C) and black (K) image data signals are transmitted from the controller unit 201 to the engine control unit 203 through the respective image signal line 110 to 113.

The controller unit 201 receives image information and a print instruction from the host computer 200. The controller unit 201 analyzes the received image information, converts the information into bit data, and transmits video signals for respective images to be formed on the recording sheet via the video interface unit 204 to the engine control unit 203. Furthermore, the controller unit 201 transmits a print reservation instruction to the engine control unit 203 according to the received print instruction, and transmits a print start instruction to the engine control unit 203 at a timing when the engine control unit 203 comes into a printable state.

The engine control unit 203 performs preparation for execution of printing in an order of the print reservation instructions received from the controller unit 201, and waits for the print start instruction from the controller unit 201. Upon receipt of print start instruction, the engine control unit 203 starts a starting-up process. After completion of the starting-up process, the engine control unit 203 outputs /TOP signal, which serves as a reference timing for the output of the video signal, to the controller unit 201, and starts a printing operation for the print reservation instructions.

[Operation of Each Control Unit According to Job Execution]

Next, an operation is described in the case where the print reservation instruction mixedly including designations of the full color mode and the black and white mode in double-sided two-sheet alternate printing is transmitted from the controller unit 201 to the engine control unit 203 in the image forming apparatus having the above configuration.

Figure 4:
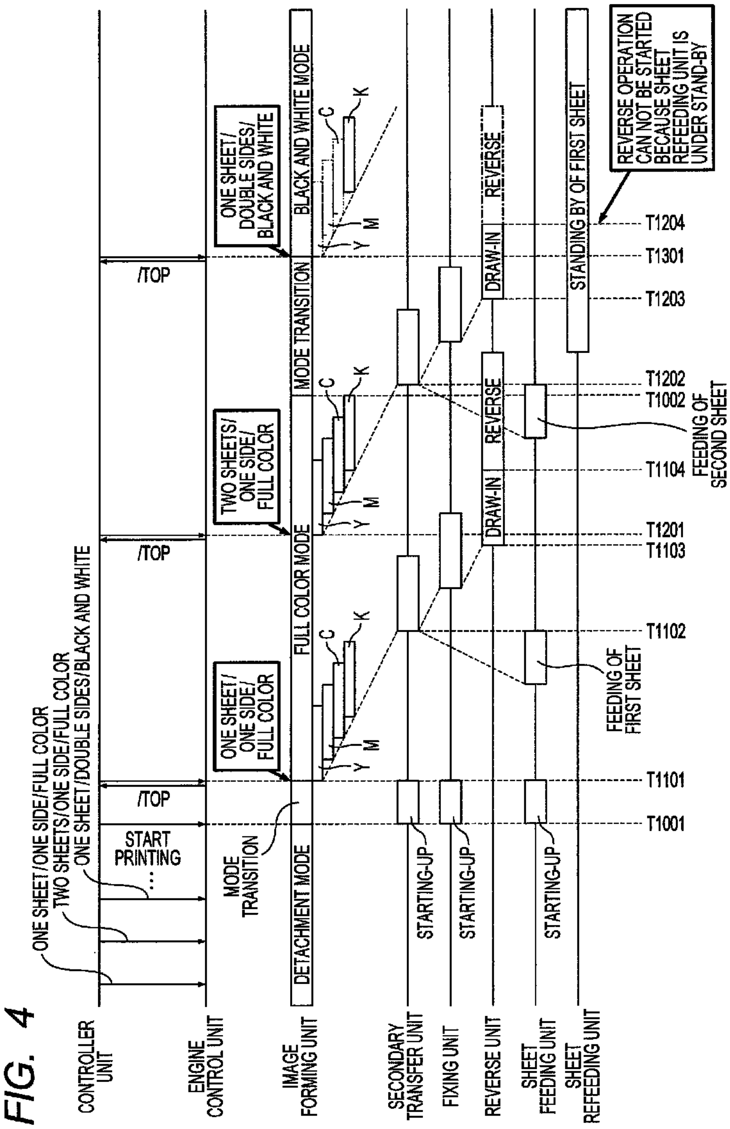
FIG. 4 is a timing chart illustrating an image forming operation of the image forming apparatus of Embodiment 1.

FIG. 4 is a timing chart illustrating the print reservation instructions transmitted from the controller unit 201 to the engine control unit 203 and the operation of the engine control unit 203 sequentially executing the content of the print reservation instructions according to this embodiment. In FIG. 4, an upper part of the timing chart illustrates transmission and reception of signals (print reservation instruction, print start instruction, and /TOP signal) between the controller unit 201 and the engine control unit 203. A lower part of the timing chart illustrates the operations of control units (image forming unit, secondary transfer unit, reverse unit, sheet feeding unit, and sheet refeeding unit) included in the image forming apparatus. In FIG. 4, the horizontal axis indicates time. The diagram illustrates operation timings T1001 to T1002, T1101 to T1104, T1201 to T1204, and T1301.

In FIG. 4, the content of the print reservation instructions (printing information) transmitted from the controller unit 201 to the engine control unit 203 and acquired by the engine control unit 203, and the order of the print reservations are as follows.

One sheet/first surface/full color mode (print reservation 1)

Two sheets/first surface/full color mode (print reservation 2)

One sheet/second surface/black and white mode (print reservation 3)

Three sheets/first surface/full color mode (print reservation 4)

Two sheets/second surface/full color mode (print reservation 5)

Three sheets/second surface/full color mode (print reservation 6)

In the content of the print reservations, the first designated item among three designated items delimited by forward slashes (/) indicates the order of recording sheets for designating the recording sheet, that is, the ordinal number of the recording sheet to be printed. The case of the one sheet indicates the first sheet among the recording sheets. The second designated item indicates a surface between the surfaces of the recording sheet. In the case of an image forming instruction for the first surface, an image is formed on a top surface, while in the case of an image forming instruction for the second surface, an image forming is formed on a back surface. The third designated item indicates the type of an image transmitted from the controller unit 201. In the case of the full color mode, the item indicates a multi-color image. In the case of the black and white mode, the item indicates an image only using black. Numerals in the parentheses indicate the orders of execution of the print reservation instructions.

[Example of Image Forming Operation Causing Printing Failure]

Next, the operation upon receipt of the print start instruction by the engine control unit 203 after receipt of the print reservation instruction described above is described with reference to the timing chart illustrated at the lower part of FIG. 4.

Before image formation, the engine control unit 203 receives the print reservation instruction from the controller unit 201. The acquired print reservation instruction is stored in the RAM 214 described above. Upon receipt of the print start instruction (indicated by START PRINTING in the drawing) from the controller unit 201 (T1001), the image forming unit, the secondary transfer unit, the fixing unit and the sheet feeding unit of the image forming apparatus described with reference to FIG. 1 start a starting-up process. Since the print reservation 1 designates the full color mode, the image forming unit causes the detachment mode (FIG. 2A) to transition to the full color mode (FIG. 2C) in the starting-up process. Upon completion of the starting-up processes in these units, the engine control unit 203 transmits the /TOP signal to the controller unit 201, and the controller unit 201 starts image output (image data signal output) corresponding to the print reservation 1 (T1101). The sheet feeding unit 1 feeds the recording sheet of the first sheet in synchronization with the timing when the toner images formed on the photosensitive drums 8 of the yellow, magenta, cyan, black image forming units and sequentially transferred onto the intermediate transfer belt 11 reach the secondary transfer unit. In the secondary transfer unit, transfer of the toner images on the intermediate transfer belt 11 onto the recording sheet conveyed from the sheet feeding unit is started (T1102). When the first recording sheet having passed through the secondary transfer unit passes through the fixing unit 12 and reaches immediately before the reverse unit, the reverse unit drives the flapper 19 and starts a draw-in operation for the first recording sheet into the reverse unit (T1103). After the reverse unit performs the draw-in operation according to the length of the recording sheet, the flapper 19 is returned and the reverse operation is started (T1104). When a predetermined period has elapsed after start of outputting the image signal for the print reservation 1, the engine control unit 203 transmits the /TOP signal for the print reservation 2 to the controller unit 201, and the controller unit 201 starts image output for the print reservation 2 (T1201). As with the case of the first sheet of the recording sheet, the image forming unit, the secondary transfer unit, the fixing unit and the reverse unit sequentially perform processes for the second recording sheet (T1201 to 1203). The print reservation 3 designates the black and white mode. Thus, at the timing of completion of image forming for the print reservation 2 by the image forming unit (T1002), the image forming unit causes the mode to transition in an order of the full color mode (FIG. 2C), the detachment mode (FIG. 2A) and the black and white mode (FIG. 2B). After the image forming unit completed the mode transition operation, the engine control unit 203 transmits the /TOP signal to the controller unit 201, and the controller unit 201 starts image output for the print reservation 3 (T1301). As illustrated in FIG. 4, in the black and white mode, the toner image is formed only by the black image forming unit. The timing of starting image forming is, however, defined with reference to the yellow image forming unit positioned most upstream in the rotation direction of the intermediate transfer belt 11 among the multiple image forming units. The image forming unit starts image forming only for the black. However, at the timing of completion of draw-in for the second recording sheet performed at this time by the reverse unit (T1204), the sheet refeeding unit is in a stand-by state of the first recording sheet. Consequently, the reverse unit cannot start the reverse operation for the second recording sheet, thus causing printing failure.

The printing failure occurs because the fixing unit and the reverse unit are always driven together. Such driving is performed because the fixing unit and the reverse unit share the same driving source (motor 25 in FIG. 1) and the reverse unit is not provided with a clutch that transmits and disengages the driving force from the driving source. The same driving source is thus shared. Consequently, to temporarily stop conveying the recording sheet at the reverse unit between the draw-in operation and the reverse operation, conveyance control and temperature control of the fixing unit are required to be temporarily stopped in an analogous manner. In the case of restart conveying the recording sheet after the temporary stop, the recording sheet is still stopped at the reverse unit. Accordingly, rotation of the fixing roller for temperature control also drives the reverse unit because the reverse unit is not provided with a clutch. Consequently, collision (jam) occurs with the first recording sheet stopped at the sheet refeeding unit. The collision prevents the driving source from starting driving.

[Determination of Whether Mode Transition is Allowed or not]

Figure 5:
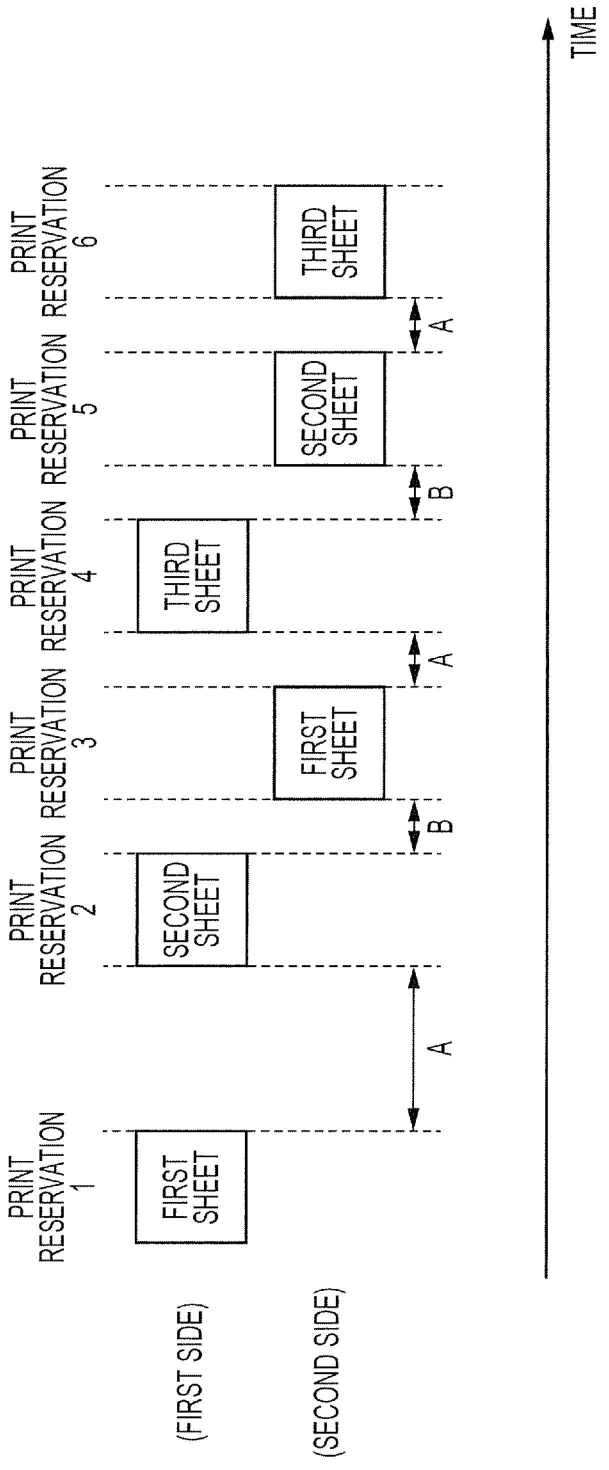
FIG. 5 is a schematic diagram of image forming intervals in double-sided two-sheet alternate printing in Embodiment 1.

FIG. 5 is a schematic diagram illustrating an image forming order (order of recording sheets, and print surface) and intervals between image forming for the print reservations in the image forming unit. The horizontal axis indicates time. When the image forming apparatus of this embodiment executes double-sided two-sheet alternate printing, only an image forming interval A between intervals A and B illustrated in the diagram can be defined sufficiently long. That is, since the recording sheet for first surface printing is supplied from the sheet feeding cassette, the interval A before first surface printing can be defined sufficiently long. Furthermore, an interval A before the last printing (the interval A before second surface printing of the third recording sheet in FIG. 5) is accompanied by no subsequent recording sheet. Consequently, this image forming interval can be defined long. Thus, if the mode transition of the image forming unit is required, the mode transition can be performed in the interval A in the diagram. In other words, an image formation mode can be chosen from between the first surface designation mode and the subsequent second surface designation mode such that the first surface mode and the second surface mode are identical to each other to cause no mode transition in the image forming unit in an interval B in the diagram. Based on the determination result by the determination unit 212 determining whether to allow the mode transition operation or not according to the content of the print reservation instruction, in the case of the print reservation described above, the image forming unit performs image forming for the print reservation 3 with being left in the full color mode so as not allow mode transition of the image forming unit immediately before start of image forming for the print reservation 3.

[Example of Image Forming Operation Causing No Printing Failure]

Figure 6:
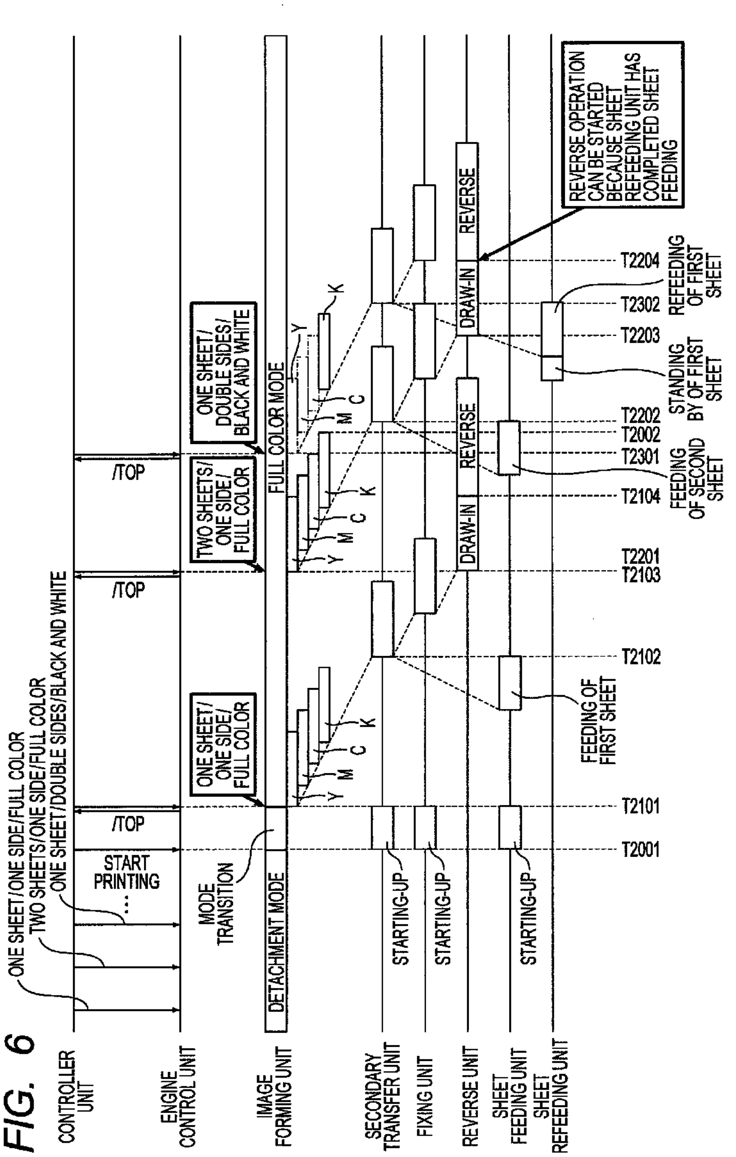
FIG. 6 illustrates a timing chart of an image forming operation of the image forming apparatus of Embodiment 1.

FIG. 6 is a diagram illustrating the operation of the engine control unit 203 where the content of the print reservation instruction similar to that of FIG. 4 described above is transmitted from the controller unit 201 to the engine control unit 203, and the determination result by the determination unit 212 is used. The content of the print reservation instruction transmitted from the controller unit 201 to the engine control unit 203 is the same as that in FIG. 4. The description of the content is thus omitted. Operations (T2101 to T2104) of the engine control unit 203 for the print reservation 1 after receipt of the print start instruction (indicated by START PRINTING in the drawing) (T2001) are the same as those in FIG. 4. The description is thus omitted. The operations of the engine control unit 203 on and after the print reservation 2 include differences from the operations in FIG. 4. The differences are hereinafter described.

When a predetermined period has elapsed after start of image output for the print reservation 1, the engine control unit 203 transmits the /TOP signal for the print reservation 2 to the controller unit 201, and the controller unit 201 starts image output for the print reservation 2 (T2201). As with the case of the first recording sheet, the image forming unit, the secondary transfer unit, the fixing unit and the reverse unit sequentially perform processes for the second recording sheet (T2201 to T2203). After start of image forming for the print reservation 2, the determination unit 212 determines that the print reservation 3 designates the black and white mode and the second surface, and the image forming only for the black can be performed in the situations of the full color mode (FIG. 2C). Based on the determination result by the determination unit 212, the engine control unit 203 transmits the /TOP signal to the controller unit 201 (T2301). Based on the determination result by the determination unit 212, the image forming unit does not perform mode transition at the mode transition timing to the black and white mode (T1002 in FIG. 4) but starts printing for the print reservation 3. As illustrated in FIG. 6, the image formation mode of the image forming unit is the full color mode, but the print reservation that is the print reservation 3 designates the black and white mode. Accordingly, the toner image is formed only by the black image forming unit. The timing of starting image forming is defined with reference to the yellow image forming unit positioned most upstream in the rotation direction of the intermediate transfer belt 11 among the multiple image forming units. In synchronization with the timing when the image only with black toner formed by the black image forming unit and transferred onto the intermediate transfer belt 11 reaches the secondary transfer unit, the sheet refeeding unit refeeds the first recording sheet. The secondary transfer unit then starts transferring the black and white image onto the second surface of the refed first recording sheet (T2302). Subsequently, the processing sequentially proceeds to the fixing unit, and the sheet is discharged from the apparatus. Subsequently, at the timing of completion of draw-in for the second recording sheet by the reverse unit (T2204), the reverse unit starts the reverse operation because the first recording sheet is not in the stand-by state in the sheet refeeding unit. Unlike the case of occurrence of printing failure illustrated in FIG. 4, printing can resultantly be continued causing no printing failure.

[Determination Flow of Whether to Allow Mode Transition by Determination Unit]

Figure 7:
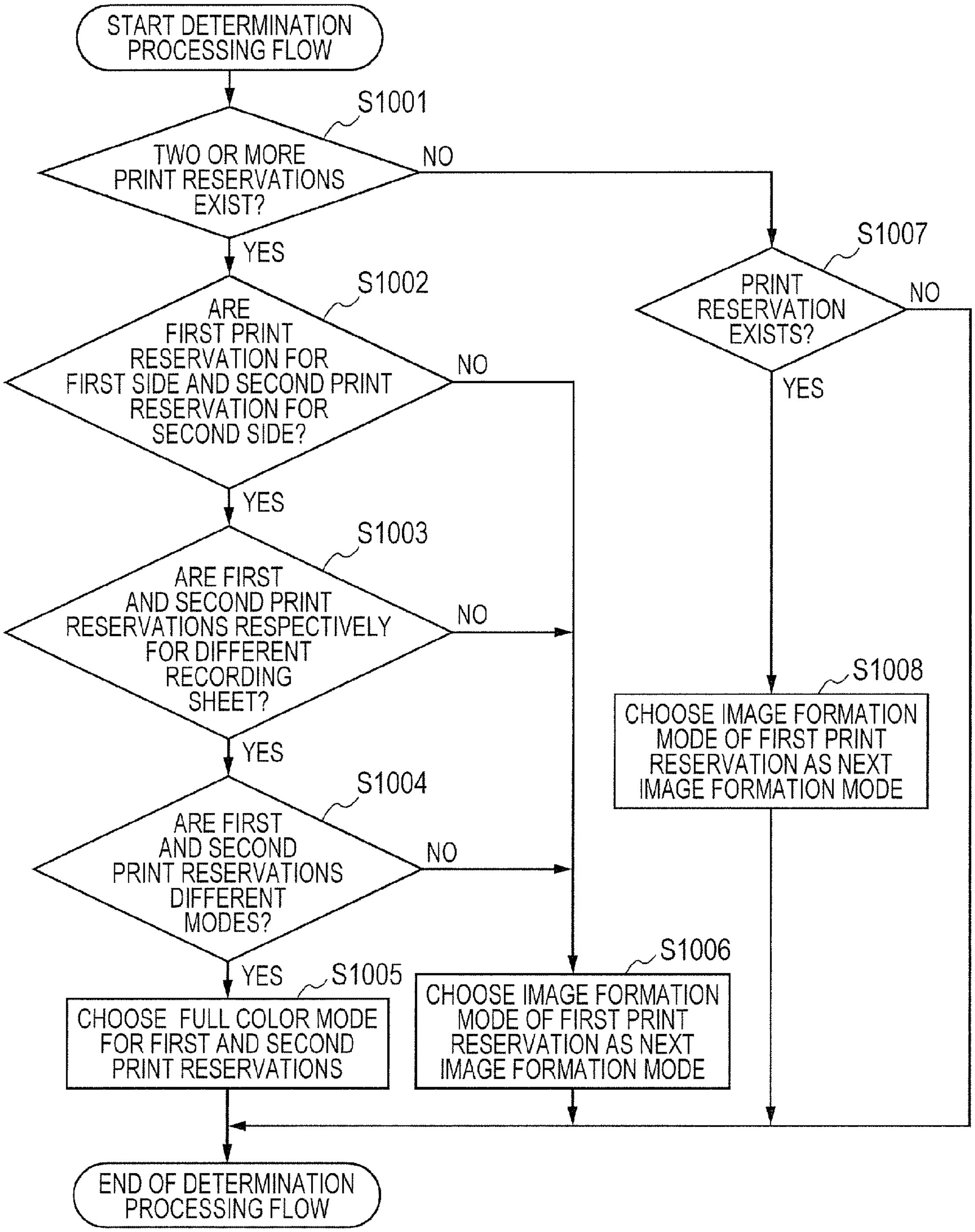
FIG. 7 illustrates a flowchart of determination by a determination unit in Embodiment 1.

As with the case of description of the timing using the determination result by the determination unit 212 with reference to FIG. 6, the determination unit 212 determines whether or not to allow mode transition by the time immediately before image forming, and the image forming unit determines whether to allow mode transition or not based on the determination result. The determination flow is described below. FIG. 7 is a flowchart illustrating the determination flow according to which the determination unit 212 determines whether to allow mode transition in the image forming unit or not. In actuality, the processes by the determination unit 212 are executed by the CPU 205.

In step (hereinafter called "S") 1001, the determination unit 212 determines whether in the engine control unit 203 there are two or more unexecuted print reservation instructions (hereinafter, called unexecuted print reservations) among the print reservation instructions received from the controller unit 201 or not. If the determination unit 212 determines that there are two or more unexecuted print reservations, the processing proceeds to S1002. If this unit determines that there is less than two, the processing proceeds to S1007. In S1002, the determination unit 212 determines whether or not the first unexecuted print reservation designates the first surface of the recording sheet and the subsequent second unexecuted print reservation designates the second surface of the recording sheet among unexecuted consecutive print reservations. If the determination unit 212 determines that the first print reservation designates the first surface of the recording sheet and the second print reservation designates the second surface of the recording sheet, the processing proceeds to S1003. If this unit determines that the first print reservation is the second surface or the second print reservation designates the first surface, the processing proceeds to S1006. In S1003, the determination unit 212 determines whether the recording sheet designated by the first unexecuted print reservation is different from the recording sheet designated by the second unexecuted print reservation or not. That is, this unit determines whether the first and second unexecuted print reservations are print reservations for different recording sheets or not, for example, whether or not the first unexecuted print reservation is a print reservation for the second recording sheet, and the second print reservation is a print reservation for the first recording sheet. If the determination unit 212 determines that the first and second print reservations designate different recording sheets, the processing proceeds to S1004. If this unit determines that the print reservations designate the same recording sheet, the processing proceeds to S1006. In S1004, the determination unit 212 determines whether the first unexecuted print reservation and the second unexecuted print reservation designate different designation modes or not, that is, whether or not one designates the full color mode and the other designates the black and white mode. If the determination unit 212 determines that the two unexecuted print reservations designate different modes, the processing proceeds to S1005. If this unit determines that the assignments designate the same mode, the processing proceeds to S1006. In S1005, the determination unit 212 instructs the image forming unit to choose the full color mode as the designation mode for the case of executing the first print reservation and the second print reservation, and finishes the processing. In S1006, the determination unit 212 instructs the image forming unit to choose the mode instructed by the first unexecuted print reservation, and finishes the processing. In S1007, the determination unit 212 determines whether there is any unexecuted print reservation instruction among the print reservation instructions received from the controller unit 201 or not. If the determination unit 212 determines that there is an unexecuted print reservation, the processing proceeds to S1008. If this unit determines that there is no unexecuted print reservation, the processing is finished. In S1008, the determination unit 212 instructs the image forming unit to choose, as the next mode, a mode instructed by the first print reservation, and the processing is finished.

For example, transition of the processing to Y in S1004 of the flowchart of FIG. 7 means mode transition of the image forming unit in the interval B illustrated in FIG. 5. Consequently, in the case of executing the first and second print reservations here, the full color mode (FIG. 2C) is chosen for both the assignments (S1005). In the cases of branching to N in S1002, S1003 and S1004, it is determined that the mode of the image forming unit does not transition in the interval B illustrated in FIG. 5, and the mode designated by the first print reservation is adopted as the mode of the image forming unit. Transition to Y in S1007 is not brought into situations of the interval B illustrated in FIG. 5. Consequently, the mode designated by the first print reservation is adopted as the mode of the image forming unit (S1008).

As described above, according to the configuration where the fixing unit and the reverse unit share the same driving source, in execution of the print reservation instruction mixedly including the full color mode and the black and white mode during double-sided two-sheet alternate printing, the mode of the image forming unit is determined so as to cause no delay of starting image forming due to mode transition. That is, the image formation mode of the image forming unit is determined so as to cause no delay of starting image forming due to mode transition between the first and second image forming, thereby allowing double-sided two-sheet alternate printing to be executed causing no printing failure. As described above, this embodiment can execute mode switching during execution of the double-sided printing job mixedly including multiple image formation modes so as to cause no printing failure and alleviate reduction in operating lives of consumable items. In particular, the image forming apparatus of this embodiment has the configuration where the driving source for reversing the front and back of the recording sheet is shared with the fixing unit, and has the reverse mechanism without a clutch for transmitting the driving force to the reverse mechanism to achieve low cost. Such an image forming apparatus allows the double-sided printing job mixedly including the black and white mode and the full color mode to be executed causing no printing failure.

Embodiment 2

Embodiment 2 describes the case where an image forming apparatus that includes an image forming unit having a configuration with a different period required for mode transition executes a double-sided printing job mixedly including designations of the full color mode and the black and white mode. In Embodiment 1, mode transition of the image forming unit is necessarily by way of the detachment mode. Consequently, mode transition requires a certain period. In the image forming unit of this embodiment, mode transition from the black and white mode to the full color mode is by way of the detachment mode as with the first embodiment. However, mode transition from the full color mode to the black and white mode is not necessarily by way of the detachment mode but direct mode transition is allowed, which is different from Embodiment 1. The other configuration of the image forming apparatus is similar to that of Embodiment 1. The description is thus omitted.

[Mode Switching]

Figures 8A, 8B, 8C:
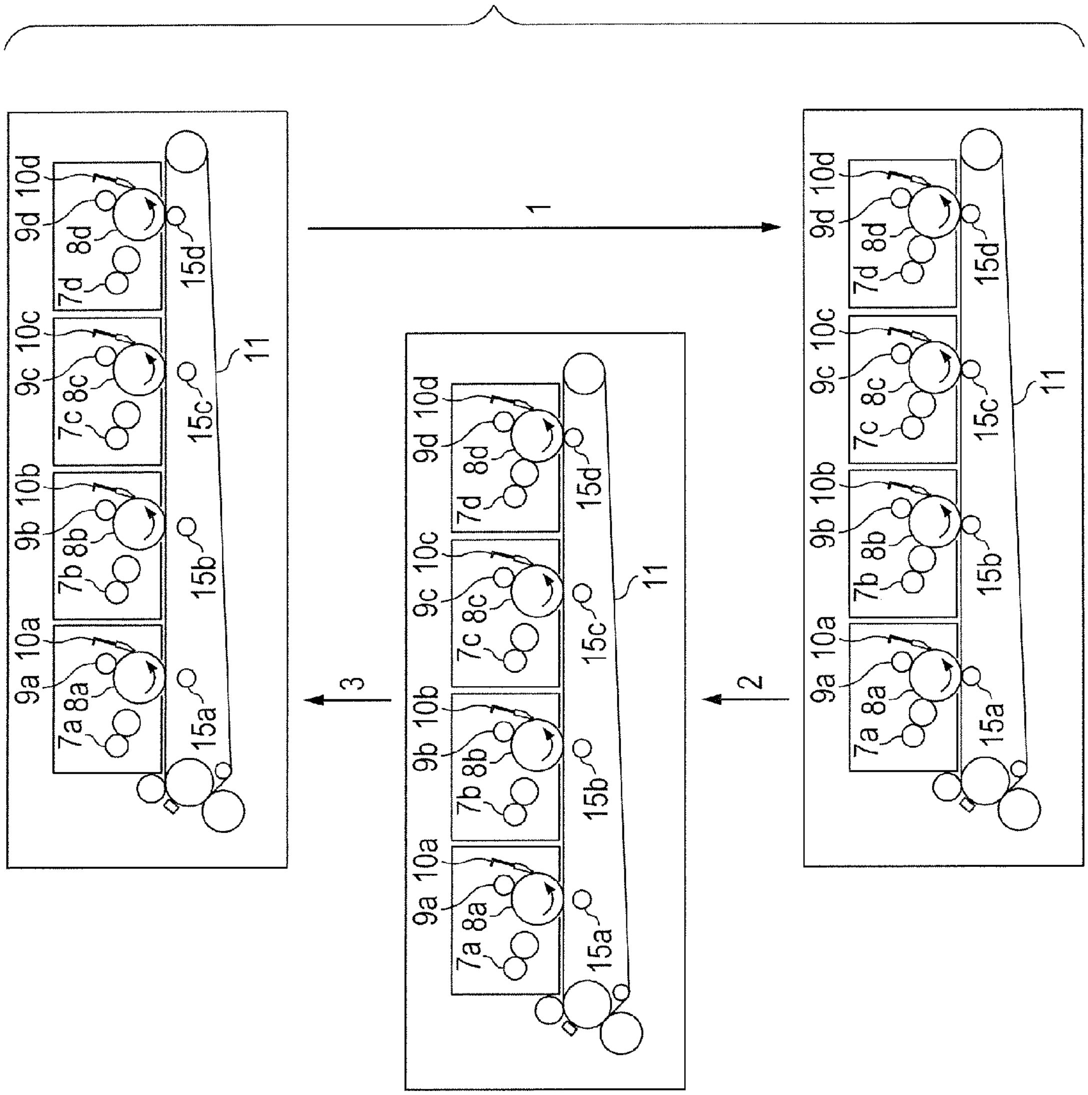
FIGS. 8A, 8B and 8C illustrate mode configuration diagrams of an image forming unit of Embodiment 2.

FIG. 8A is a diagram illustrating the positions of developing rollers 7*a* to 7*d* and primary transfer rollers 15*a* to 15*d* in modes of this embodiment, and mode transition between modes. FIG. 8A illustrates a detachment mode. FIG. 8B illustrates a black and white mode. FIG. 8C illustrates a full color mode. The modes are the same as the respective modes in Embodiment 1. The description is thus omitted. Only the mode transition between modes is herein described. Mode transition between modes is performed by driving a mode switching solenoid, not illustrated. Each time of driving the mode switching solenoid circulates mode transition so as to sequentially advance the states illustrated in FIGS. 8A, 8B and 8C in an order of an arrow 1, an arrow 2 and an arrow 3 and then return to the arrow 1. Thus, in comparison between the mode transition from the full color mode to the black and white mode and the mode transition from the black and white mode to the full color mode, the mode transition from the black and white mode to the full color mode is configured to require an extra period for transit to the detachment mode.

[Operation of Each Control Unit According to Job Execution]

Next, an operation is described in the case where execution of a job mixedly including designations of the full color mode and the black and white mode in double-sided two-sheet alternate printing is transmitted from the controller unit 201 to the engine control unit 203 in the image forming apparatus having the above configuration.

Figure 10:
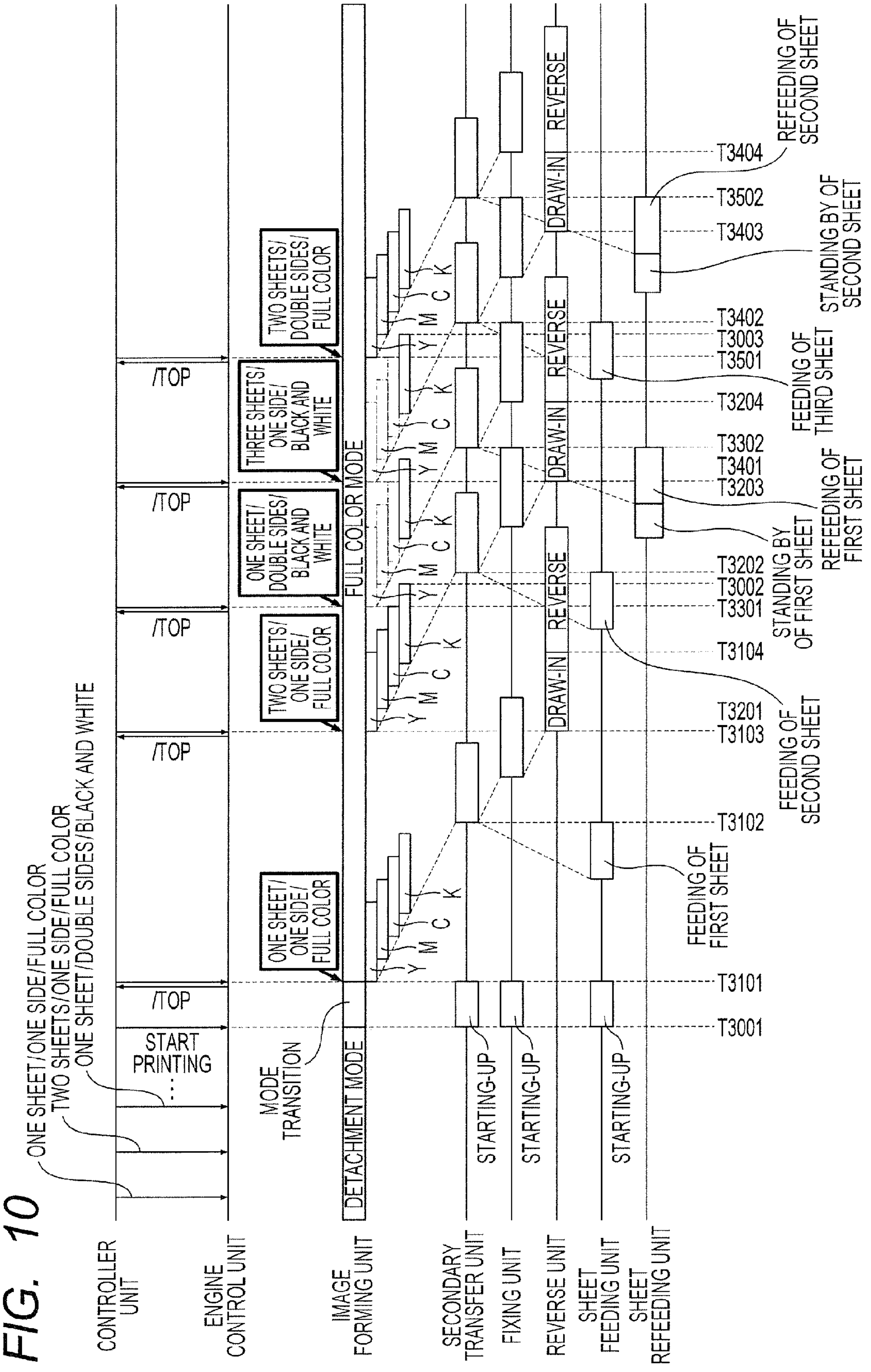
FIG. 10 is a timing chart illustrating an image forming operation of an image forming apparatus of Embodiment 2.

FIG. 10 is a timing chart illustrating the print reservation instructions transmitted from the controller unit 201 to the engine control unit 203 and the operation of the engine control unit 203 sequentially executing the content of the print reservation instructions. In FIG. 10, an upper part of the timing chart illustrates transmission and reception of signals (print reservation instruction, print start instruction, and /TOP signal) between the controller unit 201 and the engine control unit 203 according to this embodiment. A lower part of the timing chart illustrates the operations of control units (image forming unit, secondary transfer unit, fixing unit, reverse unit, sheet feeding unit, and sheet refeeding unit) included in the image forming apparatus. In FIG. 10, the horizontal axis indicates time. The diagram illustrates operation timings T3001 to T3003, T3101 to T3104, T3201 to T3204, T3301 to T3302, T3401 to T3404, and T3501 to T3502.

In FIG. 10, the content of print reservation instructions transmitted from the controller unit 201 to the engine control unit 203 and the order of the print reservations are as follows.

One sheet/first surface/full color mode (print reservation 1)

Two sheets/first surface/full color mode (print reservation 2)

One sheet/second surface/black and white mode (print reservation 3)

Three sheets/first surface/black and white mode (print reservation 4)

Two sheets/second surface/full color mode (print reservation 5)

Three sheets/second surface/full color mode (print reservation 6)

In the content of the print reservations, the three designated items delimited by forward slashes (/) are the same as the items in Embodiment 1. The description is thus omitted. Numerals in the parentheses indicate the orders of execution of the print reservation instructions.

Next, the operation upon receipt of the print start instruction by the engine control unit 203 after receipt of the print reservation instruction described above is described with reference to the lower part of the timing chart illustrated FIG. 10. The operation of each element of the image forming apparatus illustrated in the lower part of the timing chart of FIG. 10 is based on the determination by the determination flow illustrated in FIG. 7 in Embodiment 1. The print reservation 2 is a print reservation that designates the first surface of the second recording sheet, and the full color mode. The print reservation 3 is a print reservation that designates the second surface of the first recording sheet, and the black and white mode. Consequently, in the case of determination similar to that of Embodiment 1, the determination unit 212 determines that image forming is performed for the print reservation 2 and the print reservation 3 in the full color mode, immediately before start of image forming for the print reservation 2. In the case of image forming for the print reservation 1, the image forming unit is in the full color mode. Consequently, the image forming unit performs image forming for the print reservation 2 and the print reservation 3 without mode transition.

Next, the print reservation 4 designates the first surface of the third recording sheet, and the black and white mode. The print reservation 5 designates the second surface of the second recording sheet, and the full color mode. Consequently, the determination unit 212 determines that image forming is performed for the print reservation 4 and the print reservation 5 in the full color mode immediately before start of image forming for the print reservation 4. During image forming for the print reservation 3, the image forming unit is in the full color mode. Consequently, the image forming unit does not perform mode transition, and performs image forming for the print reservation 4 and the print reservation 5.

As described above, based on the determination flow described in Embodiment 1, the image forming unit performs image forming entirely in the full color mode until execution of the print reservation 5. In the configuration of the image forming unit in this embodiment, the period required for mode switching is different according to the mode of the image forming unit at the time of switching. Thus, even if the mode is switched at the timing after image forming for the print reservation 2 (T3002), start of refeeding the first recording sheet for the print reservation 3 by the time of start of reversing the second recording sheet for the print reservation 2 can continue image forming in the designated mode. Unlike in the full color mode, in the black and white mode, the yellow, magenta and cyan image forming units do not cause the developing rollers 7*a* to 7*c* to be in contact with the photosensitive drums 8*a* to 8*c*, and do not cause the primary transfer rollers 15*a* to 15*c* to be in contact with the intermediate transfer belt 11. The noncontact can avoid excessive reduction in operating lives of consumable items of the yellow, magenta and cyan image forming units (e.g., the photosensitive drum 8, developing roller 7 and primary transfer roller 15).

[Threshold of Whether to Switch Mode or not]

Figure 9:
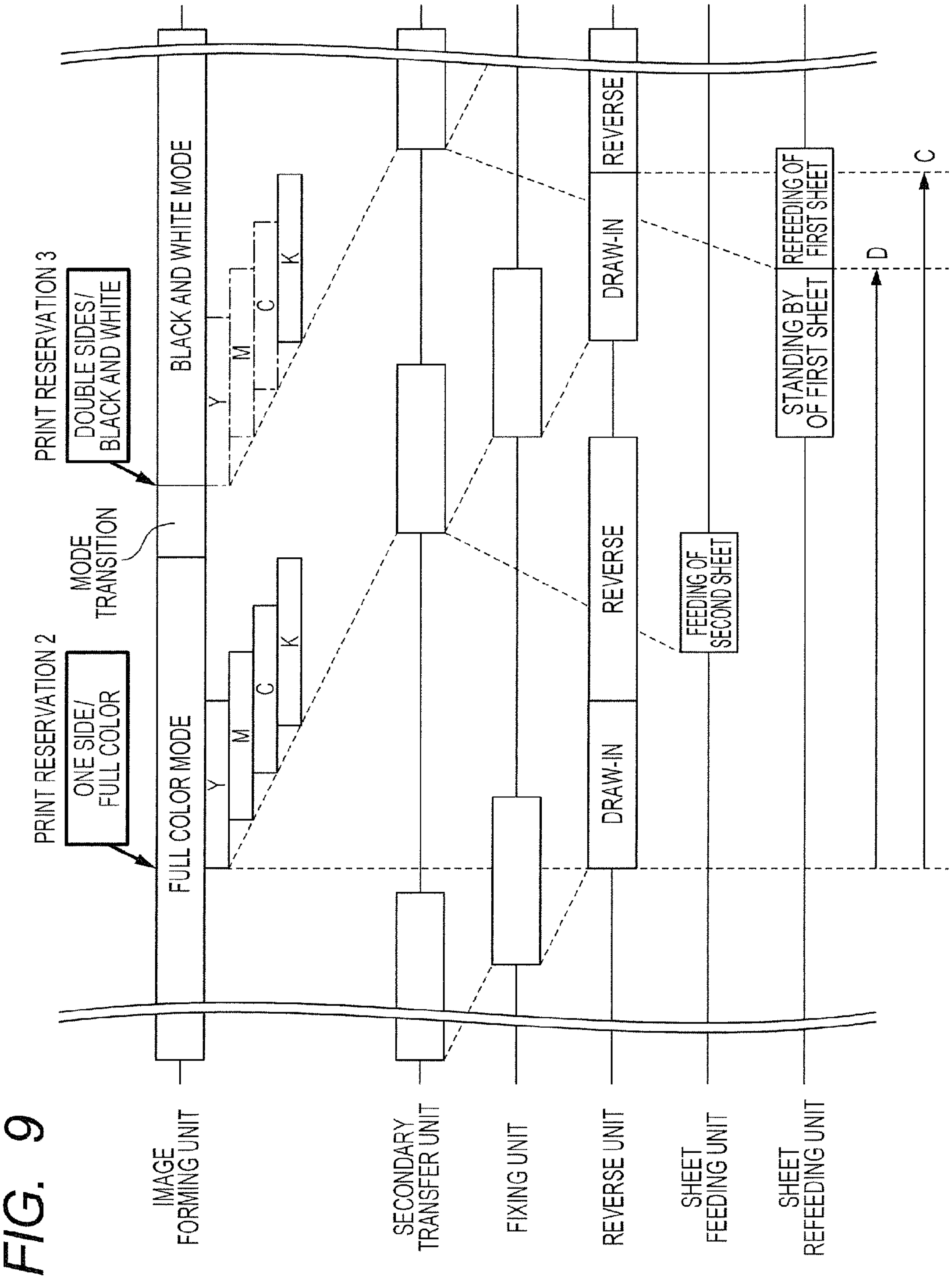
FIG. 9 illustrates a schematic diagram of a mode switching threshold.

FIG. 9 is a diagram illustrating a threshold of mode switching period in this embodiment. FIG. 9 is a timing chart in the case where the mode transitions to the black and white mode after the preceding print reservation (image forming on the first surface of the second recording sheet in the full color mode), and the subsequent print reservation 3 (image forming on the second surface of the first recording sheet in the black and white mode) is executed. In the diagram, the "mode transition" of the image forming unit designates mode transition from the full color mode to the black and white mode (the arrow 2 from FIG. 8C to FIG. 8B). A period C in the diagram schematically indicates a period from start of image forming for the preceding print reservation 2 to start of reversing the recording sheet for the print reservation 2. A period D in the diagram schematically indicates a period from start of image forming for the print reservation 2 to execution of mode switching (mode transition) of the image forming unit and further to start of refeeding the recording sheet for the subsequent print reservation 3. The recording sheet for the print reservation 2 designates the second recording sheet. The recording sheet for the print reservation 3 designates the first recording sheet under stand-by at the sheet refeeding unit. If the period D in the diagram is shorter in the temporal axis than the period C in the diagram, that is, the process corresponding to the period D is executed (completed) before the process corresponding to the period C, even execution of mode switching does not cause situations of temporarily causing conveyance of the recording sheet to stand by at the reverse unit. The required relationship between period C and period D is represented as in the following (Expression 1).

$$\text{period } C > \text{period } D, \quad \text{(Expression 1)}$$

where, the period C includes the following operation periods for the second recording sheet for the print reservation 2 in FIG. 9.

period $C$=(period from start of image forming on the second recording sheet to start of the secondary transfer)+(period from start of secondary transfer onto the second recording sheet to start of draw-in by the reverse unit)+(period required for draw-in for the second recording sheet)

The (period required for draw-in for the second recording sheet) designates a period required for draw-in operation for the second recording sheet at the reverse unit in FIG. 9, and can be calculated by (length in the recording sheet conveyance direction/recording sheet conveyance speed).

On the other hand, the period D includes the following operation period for the second recording sheet for the print reservation 2, and the first recording sheet for the print reservation 3 in an analogous manner with reference to FIG. 9.

period $D$=(period from start of image forming on the second recording sheet to end of image forming)+(mode transition operation period at the image forming unit)+(period from start of image forming for the first recording sheet to start of secondary transfer)−(refeeding period at the sheet refeeding unit)

Note that the (refeeding period at the sheet refeeding unit) designates a period required for "first sheet refeeding" at the sheet refeeding unit in FIG. 9, that is, a period from the sheet refeeding unit starting conveying the stand-by first recording sheet to arrival of the distal end of the recording sheet in the conveyance direction at the secondary transfer unit.

The period C and period D described above are substituted into (Expression 1). The (period from start of image forming on the second recording sheet to end of image forming) in the period D is replaced with the following periods. That is, the period is replaced with (period from start of image forming for the second recording sheet to start of black primary transfer)+(period required for transferring the black image to be on the second recording sheet onto the intermediate transfer belt 11). Note that (period required for transferring the black image to be on the second recording sheet onto the intermediate transfer belt 11) indicates period required to transfer the black image formed on the photosensitive drum 8*d* onto the intermediate transfer belt 11. The period can be calculated by (the length in the recording sheet conveyance direction/the rotation (movement) speed of the intermediate transfer belt 11). In this embodiment, it is assumed that the recording sheet conveyance speed is the same as the rotation (movement) speed of the intermediate transfer belt 11. The (period from start of image forming for the second recording sheet to start of secondary transfer) of the period C is the same as the (period from start of image forming for the first recording sheet to start of secondary transfer) in the period D. The (Expression 1) is organized as the following (Expression 2).

The (period from start of secondary transfer onto the second recording sheet to start of draw-in by the reverse unit)+(refeeding period at the sheet refeeding unit)−(period from start of image forming for the second recording sheet to start of black primary transfer)>(mode transition operation period at the image forming unit) (Expression 2)

In (Expression 2), mode transition operation period at the image forming unit allowing the left side to be equal to the right side can be defined as a threshold. Consequently, the threshold is as follows.

threshold=(period from start of secondary transfer onto the second recording sheet to start of draw-in by the reverse unit)+(refeeding period at the sheet refeeding unit)−(period from start of image forming for the second recording sheet to start of black primary transfer) (Expression 3)

In the example of the print reservation described above with reference to FIG. 10, the determination unit 212 determines whether period required for mode transition is longer or smaller than the threshold in the determination flow of Embodiment 1 described with reference to FIG. 7, immediately before start of image forming for the print reservation 2. If the period required for mode transition is less than the threshold, the image forming unit executes the mode transition, and subsequently executes image forming for the print reservation 3. On the other hand, if the period required for mode transition is at least the threshold, the image forming unit executes image forming for the print reservation 3 with being left in the full color mode.

[Operation of Each Control Unit According to Job Execution]

Figure 11:
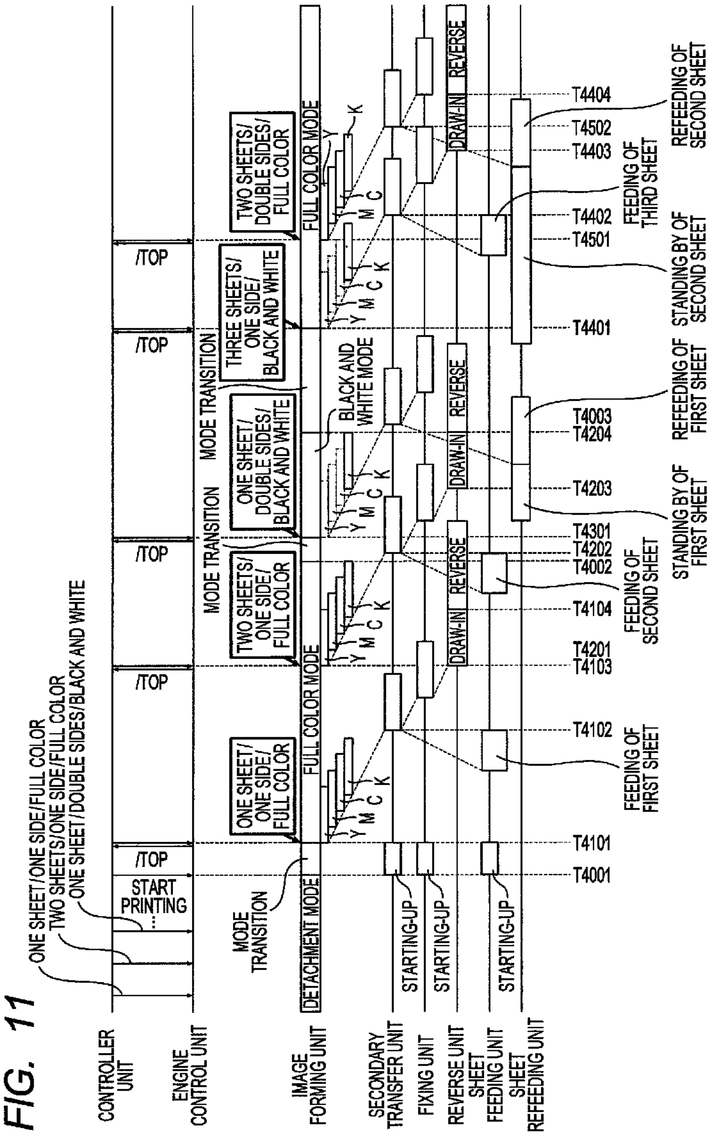
FIG. 11 is a timing chart illustrating an image forming operation of the image forming apparatus of Embodiment 2.

FIG. 11 is a diagram illustrating the operation of the engine control unit 203 in the case where the content of the print reservation as with FIG. 10 is transmitted from the controller unit 201 to the engine control unit 203, and the determination result of whether the period required for mode transition by the determination unit 212 is at least the threshold or not is used. In FIG. 11, the horizontal axis indicates time. The diagram illustrates operation timings T4001 to T4003, T4101 to T4104, T4201 to T4204, T4301, T4401 to T4404, and T4501 to T4502. FIG. 11 is similar to FIG. 10. Consequently, the difference from the timing chart of FIG. 10 is hereinafter described.

The determination unit 212 adds determination of whether the period required for mode transition is at least the threshold or not to the determination flow in Embodiment 1, and determines whether mode transition is allowed or not. In FIG. 11, the print reservation 2 designates the first surface of the recording sheet and the full color mode, and the print reservation 3 designates the second surface of the recording sheet and the black and white mode. Before start of image forming for the print reservation 2, period required for mode transition from the full color mode to the black and white mode is less than the threshold. Consequently, the determination unit 212 determines execution of image forming in conformity with the content of the print reservation 2 in the full color mode. The image forming unit is in the full color mode at this time. Accordingly, the image forming unit starts image forming for the print reservation 2 based on the determination result by the determination unit 212 without mode transition (T4201). The processing sequentially proceeds to the secondary transfer unit, the fixing unit, and the reverse unit (T4202 to T4203). The print reservation 3 designates printing on the second surface of the recording sheet in the black and white mode. As described above, the determination unit 212 determines that the period required for mode transition from the full color mode to the black and white mode is less than the threshold. Thus, the image forming unit performs transition to the black and white mode at a timing of completion of image forming for the print reservation 2 (T4002). After completion of the mode transition (T4301), single color image forming for the print reservation 3 is started.

Next, the print reservation 4 designates printing for the first surface of the recording sheet in the black and white mode. The print reservation 5 designates printing on the second surface of the recording sheet in the full color mode. Before start of image forming for the print reservation 4, the determination unit 212 determines that executes image forming for the print reservation 4 and the print reservation 5 in the full color mode because the mode transition period from the black and white mode to the full color mode is at least the threshold. The image forming unit is in the black and white mode at this time. Consequently, the image forming unit performs mode transition from the black and white mode to the full color mode based on the determination result by the determination unit 212 at the timing of completion of the image forming for the print reservation 3 (T4003). After completion of the mode transition (T4401), the image forming unit continues image forming for the print reservations 4 and 5 (T4401 to T4404, T4501 to T4502).

[Determination Flow of Whether to Allow Mode Transition by Determination Unit]

Figure 12:
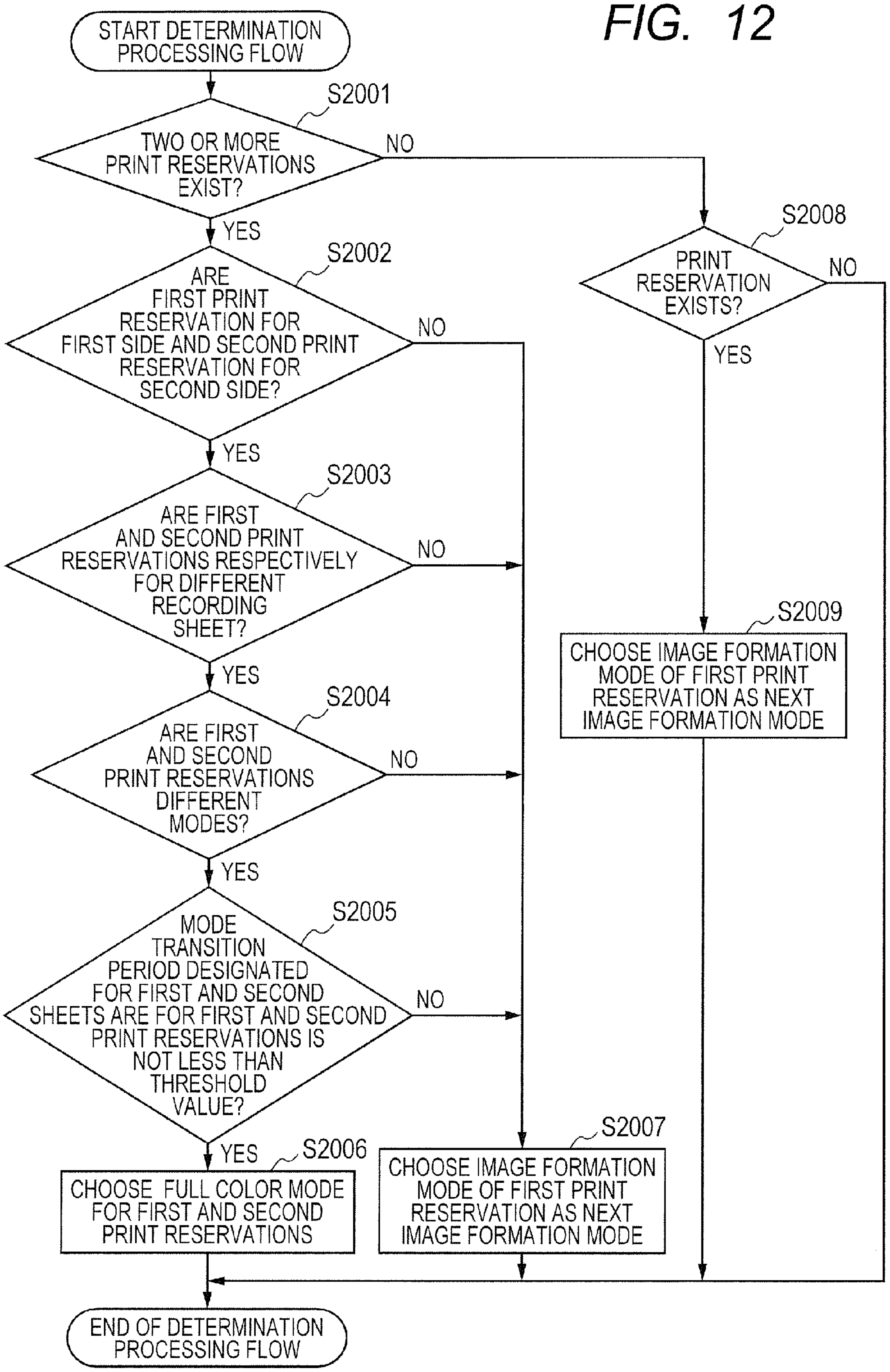
FIG. 12 is a flowchart illustrating a determination flow of a determination unit in Embodiment 2.

FIG. 12 is a flowchart of the determination flow of the determination unit 212 described in Embodiment 1 with reference to FIG. 7 to which determination of whether period required for mode transition is at least the threshold or not is added. In FIG. 12, processes of S2001 to S2004, and S2007 to S2009 are analogous to the processes S1001 to S1004, and S1006 to S1008 in FIG. 7. The description is thus omitted here.

In S2005, the determination unit 212 determines whether the period required for mode transition from the designation mode for the first unexecuted print reservation to the designation mode for the second unexecuted print reservation is at least the threshold or not. If the determination unit 212 determines that the period required for mode transition is at least the threshold, the processing proceeds to S2006. If this unit determines the period is less than the threshold, the processing proceeds to S2007. In S2006, the determination unit 212 determines that execution of mode transition causes printing failure, and instructs the image forming unit to choose the full color modes as the designation mode for executing the first print reservation and the second print reservation. The processing is then finished. In S2007, the determination unit 212 determines that execution of the mode transition causes no printing failure, and instructs the image forming unit to choose the mode instructed by the first unexecuted print reservation. The processing is then finished.

As described above, according to this embodiment, determination of whether the period required for mode transition is at least the predetermined period or not allows the image forming operation to be executed in conformity with the content of the print reservation instruction. This execution can avoid excessive reduction in operating lives of consumable items, and continue image forming. As described above, this embodiment can execute mode switching during execution of a double-sided printing job mixedly including multiple image formation modes so as to cause no printing failure and alleviate reduction in operating lives of consumable items.

Embodiment 3

Embodiment 3 describes the case where an image forming apparatus with different image forming units at which image forming is started according to different designated modes executes a double-sided printing job mixedly including designations of the full color mode and the black and white mode. In Embodiment 1, when the controller unit 201 designates the full color mode for the multi-color image or designates the black and white mode for the single color image, the timing of starting image forming is as follows. That is, the timing of starting image forming is always defined with reference to the yellow image forming unit positioned most upstream in the rotation direction of the intermediate transfer belt 11 among the multiple image forming units. In this embodiment, when the print reservation instruction designates the black and white mode for the single color image, the timing of starting image forming is as follows, irrespective of the image formation mode of the image forming unit. That is, the timing of starting image forming is defined with reference to the black image forming unit positioned most downstream of the rotation direction of the intermediate transfer belt 11 among the multiple image forming units. This point is different from that of Embodiment 1. The other configuration of the image forming apparatus is similar to that of Embodiment 1. The description is thus omitted.

[Reference of Starting Image Forming in Each Mode]

Figure 13A:
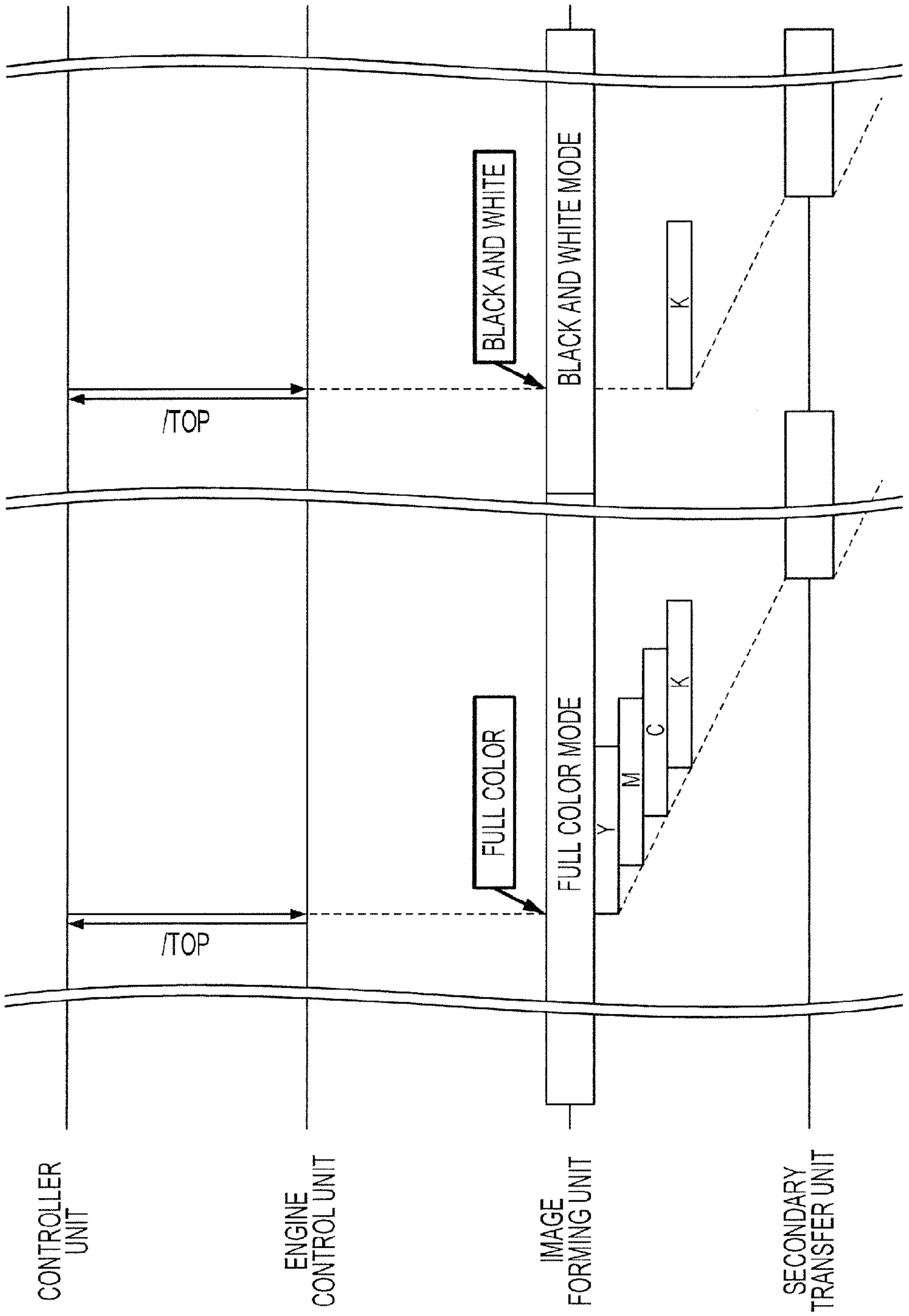
FIG. 13A illustrates a timing chart illustrating an image forming operation of Embodiment 3.

FIG. 13A is a diagram illustrating operations of the image forming unit from start of image forming in the full color mode and the black and white mode to start of secondary transfer in this embodiment. When the engine control unit 203 transmits the /TOP signal in the full color mode to the controller unit 201, the image forming is started at the yellow image forming unit positioned most upstream in the rotation direction of the intermediate transfer belt 11, and transfer by the secondary transfer unit is executed a predetermined period after the start. On the other hand, when the engine control unit 203 transmits the /TOP signal in the black and white mode to the controller unit 201, image forming is started at the black image forming unit positioned most downstream of the rotation direction of the intermediate transfer belt 11, and transfer by the secondary transfer unit is executed the predetermined period after the start. In Embodiment 1, even in the black and white mode, the timing of starting image forming is defined with reference to the yellow image forming unit positioned most upstream in the rotation direction of the intermediate transfer belt 11 among the multiple image forming unit. Consequently, even with formation of no toner image, transfer of the toner images formed on the photosensitive drums 8 onto the intermediate transfer belt 11 is started at the yellow image forming unit positioned most upstream in the rotation direction of the intermediate transfer belt 11. On the contrary, according to this embodiment, in the black and white mode, image forming is started at the black image forming unit positioned most downstream of the rotation direction of the intermediate transfer belt 11. Consequently, transfer of the toner image onto the intermediate transfer belt 11 is also started at the black image forming unit. Thus, the period for transferring the toner image onto the intermediate transfer belt 11 at each of the yellow, magenta and cyan image forming units where no toner image is formed can be removed, thereby allowing the productivity to be improved. Even when the image forming unit is in the full color mode, a print reservation instruction designating the black and white mode for the single color image starts image forming at the black image forming unit positioned most downstream of the rotation direction (moving direction) of the intermediate transfer belt 11. Consequently, the yellow, magenta and cyan image forming units do not transfer images onto the intermediate transfer belt 11. In comparison with Embodiment 1, excessive reduction in operating lives of consumable items of the yellow, magenta and cyan image forming units can be further avoided. The period from start of forming a black image in the full color mode to start of transfer by the secondary transfer unit is the same as the period from start of the black image in the black and white mode to start of transfer by the secondary transfer unit.

[Operation of Each Control Unit According to Job Execution]

Next, an operation is described in the case where the print reservation instruction mixedly including designations of the full color mode and the black and white mode in double-sided two-sheet alternate printing is transmitted from the controller unit 201 to the engine control unit 203 in the image forming apparatus having the above configuration.

Figure 14:
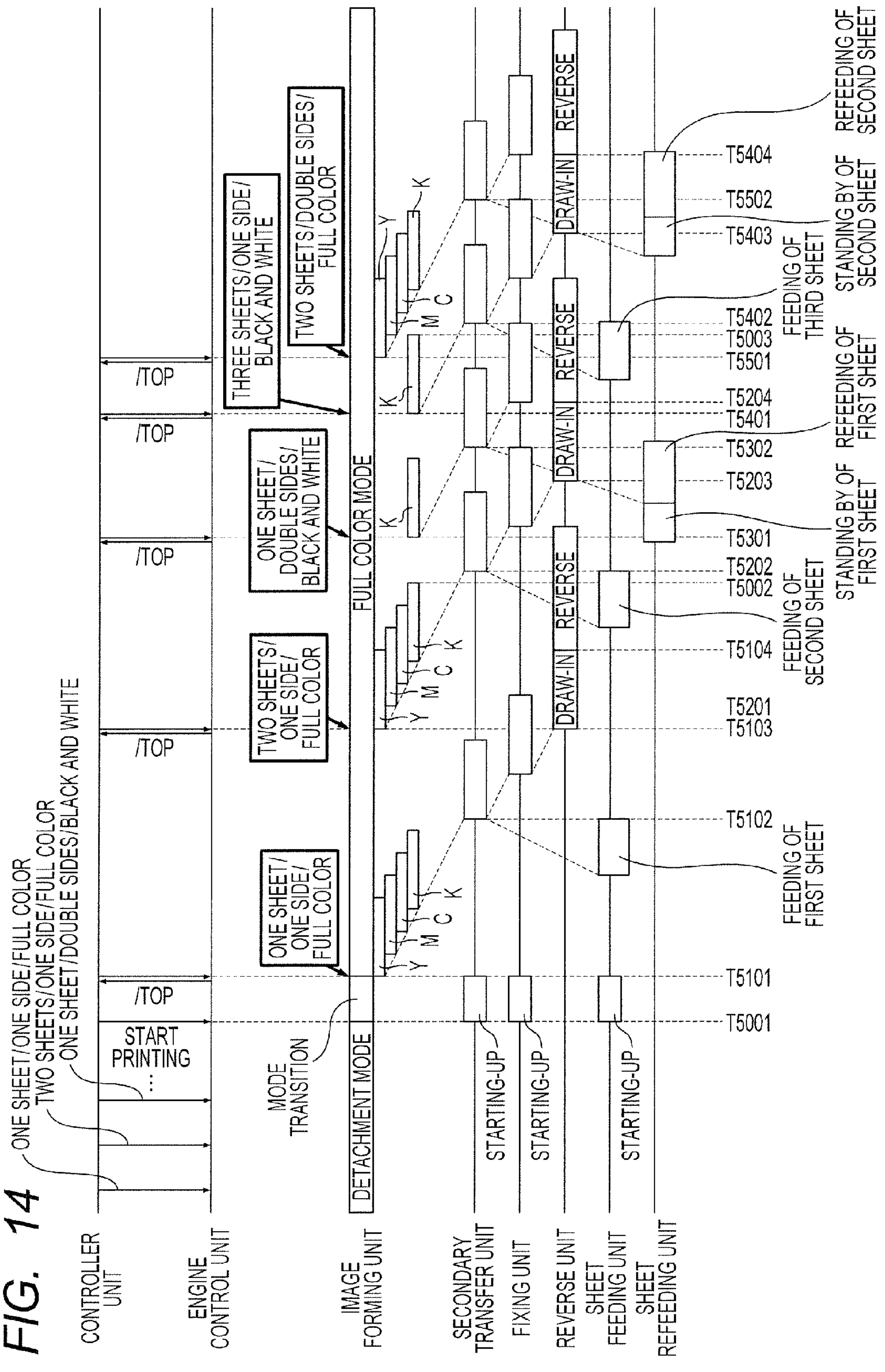
FIG. 14 illustrates a timing chart illustrating the image forming operation of an image forming apparatus of Embodiment 3.

FIG. 14 is a timing chart illustrating the print reservation instructions transmitted from the controller unit 201 to the engine control unit 203 and the operation of the engine control unit 203 sequentially executing the content of the print reservation instructions according to this embodiment. In FIG. 14, an upper part of the timing chart illustrates transmission and reception of signals (print reservation instruction, print start instruction, and /TOP signal) between the controller unit 201 and the engine control unit 203. A lower part of the timing chart illustrates the operation of control units (image forming unit, secondary transfer unit, fixing unit, reverse unit, sheet feeding unit, and sheet refeeding unit) included in the image forming apparatus. In FIG. 14, the horizontal axis indicates time. The diagram illustrates operation timings T5001 to T5003, T5101 to T5104, T5201 to T5204, T5301 to T5302, T5401 to T5404, and T5501 to T5502.

In FIG. 14, the content of the print reservation instructions transmitted from the controller unit 201 to the engine control unit 203 and the order of the print reservations are as follows.

One sheet/first surface/full color mode (print reservation 1)

Two sheets/first surface/full color mode (print reservation 2)

One sheet/second surface/black and white mode (print reservation 3)

Three sheets/first surface/black and white mode (print reservation 4)

Two sheets/second surface/full color mode (print reservation 5)

Three sheets/second surface/full color mode (print reservation 6)

In the content of the print reservations, the three designated items delimited by forward slashes (/) are the same as the items in Embodiment 1. The description is thus omitted. Numerals in the parentheses indicate the orders of execution of the print reservation instructions.

Next, the operation upon receipt of the print start instruction by the engine control unit 203 after receipt of the print reservation instruction described above is described with reference to the timing chart illustrated at the lower part of FIG. 14. The operation of each element of the image forming apparatus illustrated in the lower part of the timing chart of FIG. 14 is based on the determination by the determination flow illustrated in FIG. 7 in Embodiment 1. The print reservation 2 is a print reservation that designates the first surface of the second recording sheet, and the full color mode. The print reservation 3 is a print reservation that designates the second surface of the first recording sheet, and the black and white mode. Consequently, in the case of determination similar to that of Embodiment 1, the determination unit 212 determines that image forming is performed for the print reservation 2 and the print reservation 3 in the full color mode, immediately before start of image forming for the print reservation 2. In the case of image forming for the print reservation 1, the image forming unit is in the full color mode. Consequently, the image forming unit performs image forming for the print reservation 2 and the print reservation 3 without mode transition.

Next, the print reservation 4 designates the first surface of the third recording sheet, and the black and white mode. The print reservation 5 designates the second surface of the second recording sheet, and the full color mode. Consequently, the determination unit 212 determines that image forming is performed for the print reservation 4 and the print reservation 5 in the full color mode, immediately before start of image forming for the print reservation 4. During image forming for the print reservation 3, the image forming unit is in the full color mode. Consequently, the image forming unit does not perform mode transition, and performs image forming for the print reservation 4 and the print reservation 5.

As described above, based on the determination flow described in Embodiment 1, the image forming unit performs image forming entirely in the full color mode until execution of the print reservation 5. In the configuration of the image forming unit in this embodiment, the image forming unit at which image forming is started is different between the full color mode and the black and white mode. Thus, even if the mode is switched at the timing after image forming for the print reservation 2 (T5002), start of refeeding the first recording sheet for the print reservation 3 by the time of start of reversing the second recording sheet for the print reservation 2 can continue image forming in the designated mode. As a result, excessive reduction in operating lives of consumable items of the yellow, magenta and cyan image forming units can be avoided.

[Threshold of Whether to Switch Mode or not]

Figure 13B:
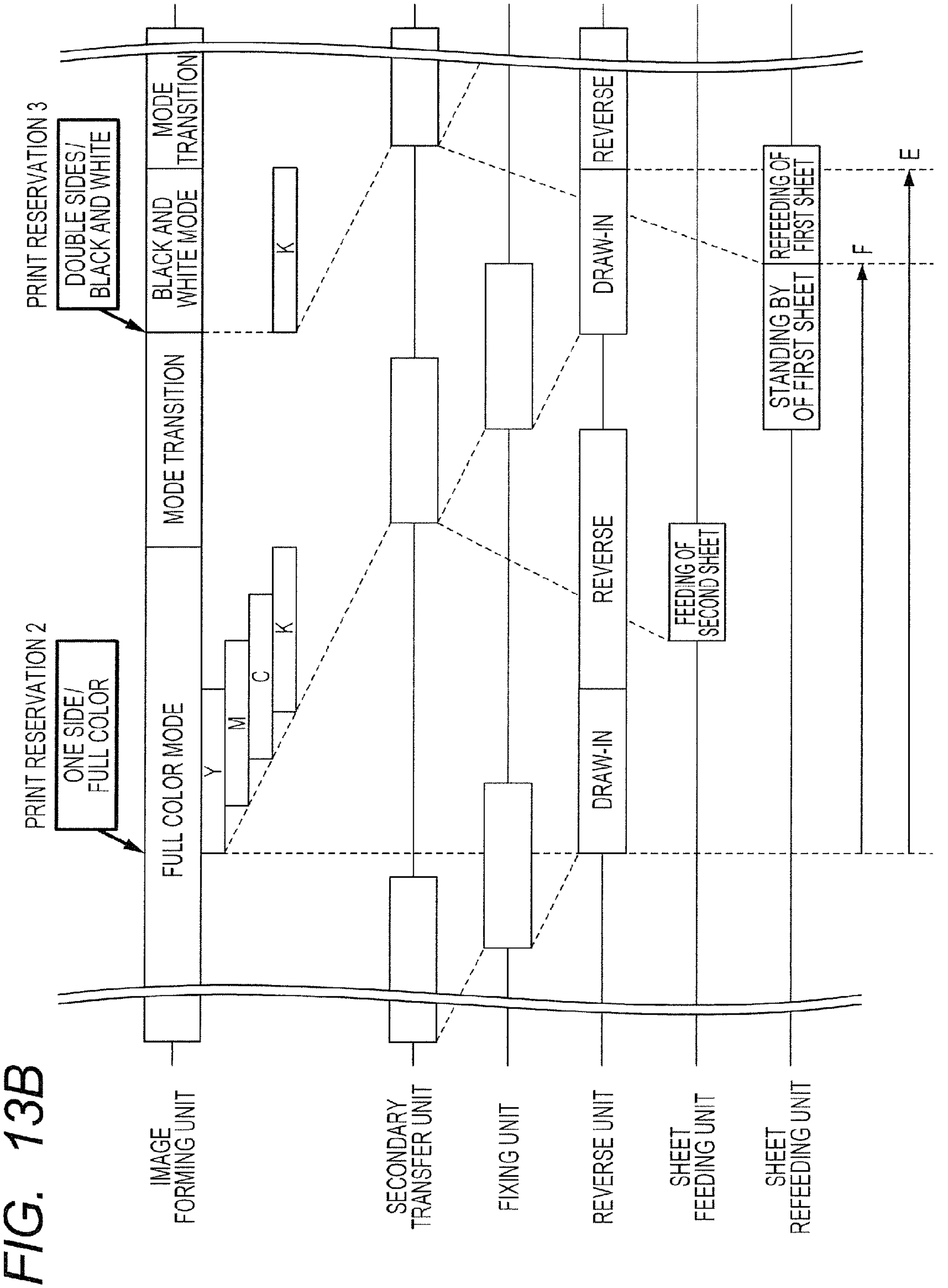
FIG. 13B illustrates a schematic diagram of a mode switching threshold for the image forming operation.

FIG. 13B is a diagram illustrating a threshold of mode switching period in this embodiment. FIG. 13B is a timing chart in the case where the mode transitions to the black and white mode after the preceding print reservation (image forming on the first surface of the second recording sheet in the full color mode), and the subsequent print reservation 3 (image forming on the second surface of the first recording sheet in the black and white mode) is executed. In the diagram, the "mode transition" of the image forming unit designates mode transition from the full color mode to the detachment mode (the arrow 2 between FIG. 2A to FIG. 2C) and mode transition from the detachment mode to the black and white mode (the arrow 1 from FIG. 2A to FIG. 2B). A period E in the diagram schematically indicates a period from start of image forming for the preceding print reservation 2 to start of reversing the recording sheet for the print reservation 2. A period F in the diagram schematically indicates a period from start of image forming for the print reservation 2 to execution of mode switching (mode transition) of the image forming unit and further to start of refeeding the recording sheet for the subsequent print reservation 3. The recording sheet for the print reservation 2 designates the second recording sheet. The recording sheet for the print reservation 3 designates the first recording sheet under stand-by at the sheet refeeding unit. If the period F in the diagram is shorter in the temporal axis than the period E in the diagram, that is, there is a relationship where the process corresponding to the period F is executed (completed) before the process corresponding to the period E, even execution of mode switching does not cause situations of temporarily causing conveyance of the recording sheet to stand by at the reverse unit. The required relationship between period E and period F is represented as in the following (Expression 4).

period $E$>period $F$, (Expression 4)

where, the period E includes the following operation periods for the second recording sheet for the print reservation 2 in FIG. 13B.

period $E$=(period from start of yellow position image forming on the second recording sheet to start of secondary transfer)+(period from start of secondary transfer onto the second recording sheet to start of draw-in by the reverse unit)+(period required for draw-in for the second recording sheet)

The (period required for draw-in for the second recording sheet) designates a period required for draw-in operation for the second recording sheet at the reverse unit in FIG. 13B, and can be calculated by (length in the recording sheet conveyance direction/recording sheet conveyance speed).

On the other hand, the period F includes the following operation period for the second recording sheet for the print reservation 2, and the first recording sheet for the print reservation 3 in an analogous manner, with reference to FIG. 13B.

period $F$=(period from start of yellow position image forming on the second recording sheet to end of image forming)+(mode transition operation period at the image forming unit)+(period from start of black position image forming on the first recording sheet to start of secondary transfer)−(refeeding period at the sheet refeeding unit)

Note that (refeeding period at the sheet refeeding unit) designates a period required for "first sheet refeeding" at the sheet refeeding unit in FIG. 13B, that is, a period from the sheet refeeding unit starting conveying the stand-by first recording sheet to arrival of the distal end of the recording sheet in the conveyance direction at the secondary transfer unit.

The period E and period F described above are substituted into (Expression 4). The (period from start of yellow position image forming on the second recording sheet to end of image forming) in the period F is replaced with the following expression. That is, the period is replaced with (period from start of yellow position image forming to start of yellow primary transfer)+(period from start of yellow primary transfer to start of black primary transfer)+(period required for transferring the black image onto the intermediate transfer belt 11) for the second recording sheet. Note that the (period required for transferring the black image onto the intermediate transfer belt 11) indicates period required for transferring the black image formed on the photosensitive drum 8*d* for the second recording sheet onto the intermediate transfer belt 11. The period can be calculated by (the length in the recording sheet conveyance direction/the rotation (movement) speed of the intermediate transfer belt 11). In this embodiment, it is assumed that the recording sheet conveyance speed is the same as the rotation (movement) speed of the intermediate transfer belt 11.

The (period from start of black position image forming on the first recording sheet to start of secondary transfer) in the period F is replaced with the following expression. That is, the period is replaced with (period from start of black position image forming to start of black primary transfer)+(period from start of black primary transfer to start of secondary transfer) for the first recording sheet.

Furthermore, (period from start of yellow position image forming on the second recording sheet to start of secondary transfer) in the period E is replaced with the following expression. That is, the period is replaced with (period from start of yellow position image forming to start of yellow primary transfer)+(period from start of yellow primary transfer to start of black primary transfer)+(period from start of black primary transfer to start of secondary transfer) for the second recording sheet. The (period from start of black primary transfer to start of secondary transfer) for the second recording sheet in the period E is the same as the (period from start of black primary transfer to start of secondary transfer) for the first recording sheet in period F, which have been described above. The (Expression 4) is organized as the following (Expression 5).

(period from start of secondary transfer onto the second recording sheet to start of draw-in by the reverse unit)+(refeeding period at the sheet refeeding unit)−(period from start of black position image forming to start of black primary transfer for the first recording sheet)>(mode transition operation period at the image forming unit) (Expression 5)

In (Expression 5), mode transition operation period at the image forming unit allowing the left side to be equal to the right side can be defined as a threshold. Consequently, the threshold is as follows.

threshold=(period from start of secondary transfer onto the second recording sheet to start of draw-in by the reverse unit)+(refeeding period at the sheet refeeding unit)−(period from start of black position image forming on to the first recording sheet to start of black primary transfer for the first recording sheet) (Expression 6)

Note that the (period from start of black position image forming to start of black primary transfer) in (Expression 6) may be, for example, (period from start of yellow position image forming to start of yellow primary transfer).

In the example of the print reservation described above with reference to FIG. 14, the determination unit 212 determines whether the period required for mode transition is longer or smaller than the threshold in the determination flow of Embodiment 1 described with reference to FIG. 7, immediately before start of image forming for the print reservation 2. If the period required for mode transition is less than the threshold, the image forming unit executes the mode transition, and subsequently executes image forming for the print reservation 3. On the other hand, if the period required for mode transition is at least the threshold, the image forming unit executes image forming for the print reservation 3 with being left in the full color mode.

[Operation of Each Control Unit According to Job Execution]

Figure 15:
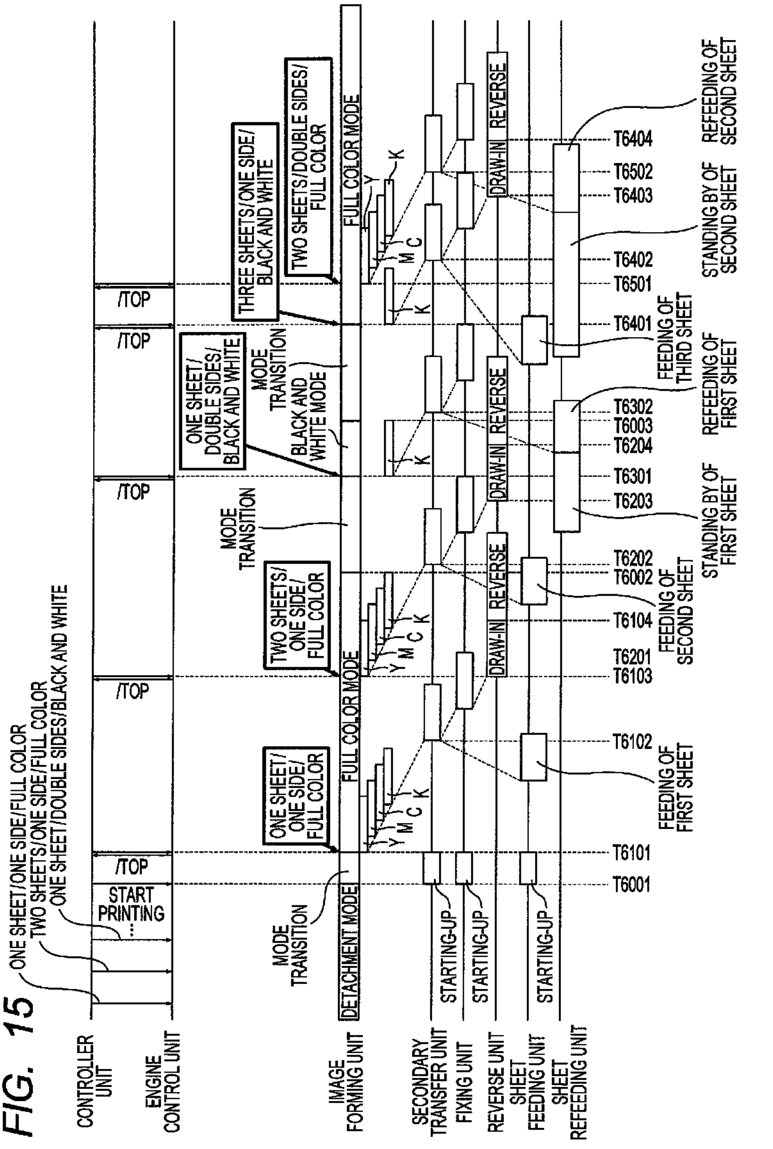
FIG. 15 illustrates a timing chart illustrating the image forming operation of the image forming apparatus of Embodiment 3.

FIG. 15 is a diagram illustrating the operation of the engine control unit 203 in the case where the content of the print reservation as with FIG. 14 is transmitted from the controller unit 201 to the engine control unit 203, and the determination result of whether the period required for mode transition by the determination unit 212 is at least the threshold or not is used. In FIG. 15, the horizontal axis indicates time. The diagram illustrates operation timings T6001 to T6003, T6101 to T6104, T6201 to T6204, T6301 to T6302, T6401 to T6404, and T6501 to T6502. FIG. 15 is similar to FIG. 14. Consequently, the difference from the timing chart of FIG. 14 is hereinafter described.

The determination unit 212 adds determination of whether the period required for mode transition is at least the threshold or not to the determination flow in Embodiment 1, and determines whether mode transition is allowed or not. In FIG. 15, the print reservation 2 designates the first surface of the recording sheet and the full color mode, and the print reservation 3 designates the second surface of the recording sheet and the black and white mode. Before start of image forming for the print reservation 2, period required for mode transition from the full color mode to the black and white mode is less than the threshold. Consequently, the determination unit 212 determines execution of image forming in conformity with the content of the print reservation 2 in the full color mode. The image forming unit is in the full color mode at this time. Accordingly, the image forming unit starts image forming for the print reservation 2 based on the determination result by the determination unit 212 without mode transition (T6201). The processing sequentially proceeds to the secondary transfer unit, the fixing unit, and the reverse unit (T6202 to T6203). The print reservation 3 designates printing on the second surface of the recording sheet in the black and white mode. As described above, the determination unit 212 determines that the period required for mode transition from the full color mode to the black and white mode is less than the threshold. Thus, the image forming unit performs mode transition to the black and white mode at a timing of completion of image forming for the print reservation 2 (T6002). After completion of the mode transition (T6301), and single color image forming for the print reservation 3 is started.

Next, the print reservation 4 designates printing for the first surface of the recording sheet in the black and white mode. The print reservation 5 designates printing on the second surface of the recording sheet in the full color mode. Before start of image forming for the print reservation 4, the determination unit 212 determines that executes image forming for the print reservation 4 and the print reservation 5 in the full color mode because the mode transition period from the black and white mode to the full color mode is at least the threshold. The image forming unit is in the black and white mode at this time. Consequently, the image forming unit performs mode transition from the black and white mode to the full color mode based on the determination result by the determination unit 212 at the timing of completion of the image forming for the print reservation 3 (T6003). After completion of the mode transition (T6401), the image forming unit continues image forming for the print reservations 4 and 5 (T6401 to T6404, T6501 to T6502). Even though the determination flow by the determination unit 212 in this embodiment has the different threshold to be applied, this determination flow is the same as that of Embodiment 2 in FIG. 12. Here, the description is thus omitted.

As described above, this embodiment has the configuration having different references for start of image forming according to whether the image to be formed is multi-colored or single-colored (black), determines whether the period required for mode transition is at least the predetermined period or not, and thus determines whether mode transition is allowed or not. This determination can execute the image forming operation in conformity with the content of the print reservation instruction. The execution can continue image formation without excessively reducing the operating lives of consumable items, and continue image forming. As described above, this embodiment can execute mode switching during execution of the double-sided printing job mixedly including multiple image formation modes so as to cause no printing failure and alleviate reduction in operating lives of consumable items.

In the above embodiments, the description has been made using the example where the full color mode is adopted as the mode for forming the multi-color image, and the black and white mode is adopted as the mode for forming the single color image. However, the modes are not limited to these modes. The mode for forming multiple colors may be a mode for forming an image using at least two image forming units. The mode for forming the single color image may be a mode for forming an image using one image forming unit other than for the black.

In the above embodiments, the description has been made for the case of switching between the mode for forming the multi-color image and the mode for forming the single color image. However, the case is not limited to such switching. One of the modes is not necessarily the mode for forming the single color image. Only a relationship is required where among the multiple image formation modes, an image formed in one image formation mode can be formed also in another image formation mode. That is, only a relationship is required where an image forming unit used in one image formation mode is also used in the other image formation mode. The switching control is not necessarily between two modes. Alternatively, the control may be switching control between three or more modes. In the above embodiments, the description has been made for the configuration that primarily transfers an image from the photosensitive drums 8 onto the intermediate transfer belt 11, and secondarily transfers the image formed on the intermediate transfer belt 11 onto the recording material. However, the transfer is not limited to this example. For instance, a configuration may be adopted that sequentially transfers images from multiple photosensitive drums 8 to the recording material, thus forming a multi-color image.

In the above embodiments, the description has been made for the configuration including the same motor shared by driving the fixing unit and the reverse unit. However, the configuration is not limited to such a configuration. For example, individual motors may be separately provided for the driving the fixing unit and for the driving the reverse unit. The present invention is applicable to a configuration where the individual motors do not stop and do continuously rotate during image forming.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-123570, filed Jun. 16, 2014, and Japanese Patent Application No. 2015-075032, filed Apr. 1, 2015, which are hereby incorporated by reference herein in their entirety.

What is claimed is:

1. An image forming apparatus, comprising:

a plurality of photosensitive drums;

an intermediate transfer belt onto which toner images formed on the plurality of the photosensitive drums are primary transferred, respectively;

a transfer roller that secondary transfers a toner image formed on the intermediate transfer belt onto a recording material;

a fixing unit that heats the recording material and fixes the transferred toner image onto the recording material;

a tray on which the recording material is stacked;

a feed roller that feeds the recording material stacked on the tray to the transfer roller;

a reverse roller that reverses the recording material onto which the toner image has been fixed by the fixing unit, and conveys the recording material;

a conveyance roller that conveys the recording material conveyed by the reverse roller to the transfer roller;

a motor that drives the reverse roller; and a processor that switches an image formation mode between a first mode in which a first photosensitive drum and a second photosensitive drum different from the first photosensitive drum among the plurality of the photosensitive drums are used to form the toner image, and a second mode in which the second photosensitive drum is used to form the toner image without using the first photosensitive drum, wherein the motor continuously drives the reverse roller while a toner image is formed on a first recording material fed by the feed roller and subsequently a toner image is formed on a second recording material that is different from the first recording material and conveyed by the conveyance roller, and in a case that the image formation mode for the first recording material is different from the image formation mode for the second recording material, the processor sets the image formation mode to the first mode while the toner images are formed on the first recording material and the second recording material.

2. The image forming apparatus according to claim 1, wherein in a case that the image formation mode for the first recording material and the image formation mode for the second recording material are the first mode, the processor sets the image formation mode to the first mode while the toner images are formed on the first recording material and the second recording material, and in a case that the image formation mode for the first recording material and the image formation mode for the second recording material are the second mode, the processor sets the image formation mode to the second mode while the toner images are formed on the first recording material and the second recording material.

3. The image forming apparatus according to claim 1, wherein the first mode is a full color mode for forming a color image, and the second mode is a black and white mode for forming a black and white image.

4. The image forming apparatus according to claim 3, wherein in a case that the image formation mode for the first recording material is the full color mode and the image formation mode for the second recording material is the black and white mode, the processor sets the image formation mode to the full color mode while the color image is formed on the first recording material and the black and white image is formed on the second recording material, and in a case that the image formation mode for the first recording material is the black and white mode and the image formation mode for the second recording material is the full color mode, the processor sets the image formation mode to the full color mode while the black and white image is formed on the first recording material and the color image is formed on the second recording material.

5. The image forming apparatus according to claim 4, wherein in a case that the image formation mode for the first recording material and the image formation mode for the second recording material are the full color mode, the processor sets the image formation mode to the full color mode while the color images are formed on the first recording material and the second recording material, and in a case that the image formation mode for the first recording material and the image formation mode for the second recording material are the black and white mode, the processor sets the image formation mode to the black and white mode while the black and white images are formed on the first and second recording materials.

6. The image forming apparatus according to claim 3, wherein the image forming apparatus has a detachment mode in which no toner image is formed on the plurality of the photosensitive drums, and in a case that the processor switches the image formation mode from the full color mode to the black and white mode or switches the image formation mode from the black and white mode to the full color mode, the processor switches the image formation mode by way of the detachment mode.

7. The image forming apparatus according to claim 6, wherein in a case that the processor switches the image formation mode from the full color mode to the black and white mode, the processor switches the image formation mode from the full color mode to the detachment mode at a timing when the primary transfer of the toner image onto the intermediate transfer belt is completed, and switches the image formation mode from the detachment mode to the black and white mode at a timing when the secondary transfer of the toner image onto the recording material is completed.

8. The image forming apparatus according to claim 6, wherein in a case that the processor switches the image formation mode from the black and white mode to the full color mode, the processor switches the image formation mode from the black and white mode to the detachment mode at a timing when the primary transfer of the toner image onto the intermediate transfer belt is completed, and switches the image formation mode from the detachment mode to the full color mode at a timing when the secondary transfer of the toner image onto the recording material is completed.

9. The image forming apparatus according to claim 6, wherein the primary transfer onto the intermediate transfer belt is started at the photosensitive drum positioned most upstream in a moving direction of the intermediate transfer belt among the plurality of the photosensitive drums.

10. The image forming apparatus according to claim 6, wherein the second photosensitive drum is positioned most downstream in a moving direction of the intermediate transfer belt among the plurality of the photosensitive drums, and, in a case that a toner image to be formed is the black and white image, the primary transfer onto the intermediate transfer belt is started at the second photosensitive drum.

11. The image forming apparatus according to claim 10, wherein in a case that a period required to switch the image formation mode from the full color mode for the first recording material to the black and white mode for the second recording material is longer than a predetermined period, the processor switches the image formation mode to the full color mode before performing image forming on the first recording material.

12. The image forming apparatus according to claim 11, wherein the predetermined period is defined based on a distance between the transfer roller and the reverse roller on a conveyance path, a distance between the reverse roller and the conveyance roller on the conveyance path, a distance between the conveyance roller and the transfer roller on the conveyance path, and a conveyance speed of the recording material.

13. The image forming apparatus according to claim 6, further comprising:

a plurality of developing rollers that develop the toner images on the plurality of the photosensitive drums, respectively; and a plurality of primary transfer rollers that primary transfer toner images formed on the plurality of the photosensitive drums onto the intermediate transfer belt, respectively, wherein a second developing roller among the plurality of the developing rollers develops the toner image on the second photosensitive drum and a second primary transfer roller among the plurality of the primary transfer rollers primary transfers the toner image formed on the second photosensitive drum onto the intermediate transfer belt, wherein in a case that the image formation mode is the full color mode, all of the plurality of the developing rollers contact the plurality of the photosensitive drums, respectively, and all of the plurality of the primary transfer rollers contact the intermediate transfer belt, wherein in a case that the image formation mode is the black and white mode, the second developing roller contacts the second photosensitive drum and the other developing rollers do not contact the respective photosensitive drums, and the second primary transfer roller contacts the intermediate transfer belt and the other primary transfer rollers do not contact the intermediate transfer belt, and wherein in a case that the image formation mode is the detachment mode, all of the plurality of the developing rollers do not contact the plurality of the photosensitive drums, respectively, and the second primary transfer roller contacts the intermediate transfer belt and the other primary transfer rollers do not contact the intermediate transfer belt.

14. The image forming apparatus according to claim 3, wherein the image forming apparatus has a detachment mode in which no toner image is formed on the plurality of the photosensitive drums, and in a case that the processor switches the image formation mode from the black and white mode to the full color mode, the processor switches the image formation mode by way of the detachment mode, and, in a case that the processor switches the image formation mode from the full color mode to the black and white mode, the processor switches the image formation mode not by way of the detachment mode.

15. The image forming apparatus according to claim 14, wherein in a case that the processor switches the image formation mode from the full color mode to the black and white mode, the processor switches the image formation mode from the full color mode to the detachment mode at a timing when the primary transfer of the toner image onto the intermediate transfer belt is completed, and switches the image formation mode from the detachment mode to the full color mode at a timing when the secondary transfer of the toner image onto the recording material is completed.

16. The image forming apparatus according to claim 14, wherein the primary transfer onto the intermediate transfer belt is started at the photosensitive drum positioned most upstream in a moving direction of the intermediate transfer belt among the plurality of the photosensitive drums.

17. The image forming apparatus according to claim 16, wherein in a case that a period required to switch the image formation mode from the full color mode for the first recording material to the black and white mode for the second recording material is longer than a predetermined period, the processor switches the image formation mode to the full color mode before performing image forming on the first recording material.

18. The image forming apparatus according to claim 17, wherein the predetermined period is defined based on a distance between the transfer roller and the reverse roller on a conveyance path, a distance between the reverse roller and the conveyance roller on the conveyance path, a distance between the conveyance roller and the transfer roller on the conveyance path, and a conveyance speed of the recording material.

19. The image forming apparatus according to claim 14, further comprising:

a plurality of developing rollers that develop the toner images on the plurality of the photosensitive drums, respectively; and a plurality of primary transfer rollers that primary transfer toner images formed on the plurality of the photosensitive drums onto the intermediate transfer belt, respectively, wherein a second developing roller among the plurality of the developing rollers develops the toner image on the second photosensitive drum and a second primary transfer roller among the plurality of the primary transfer rollers primary transfers the toner image formed on the second photosensitive drum onto the intermediate transfer belt, wherein in a case that the image formation mode is the full color mode, all of the plurality of the developing rollers contact the plurality of the photosensitive drums, respectively, and all of the plurality of the primary transfer rollers contact the intermediate transfer belt, wherein in a case that the image formation mode is the black and white mode, the second developing roller contacts the second photosensitive drum and the other developing rollers do not contact the respective photosensitive drums, and the second primary transfer roller contacts the intermediate transfer belt and the other primary transfer rollers do not contact the intermediate transfer belt, and wherein in a case that the image formation mode is the detachment mode, all of the plurality of the developing rollers do not contact the plurality of the photosensitive drums, respectively, and the second primary transfer roller contacts the intermediate transfer belt and the other primary transfer rollers do not contact the intermediate transfer belt.

20. The image forming apparatus according to claim 1, wherein the motor drives the fixing unit and the reverse roller.

21. An image forming apparatus, comprising:

a plurality of photosensitive drums;

a conveyance belt that conveys a recording material;

a plurality of transfer rollers that transfer toner images formed on the plurality of the photosensitive drums onto the recording material conveyed by the conveyance belt, respectively;

a fixing unit that heats the recording material and fixes a transferred toner image onto the recording material;

a tray on which the recording material is stacked;

a feed roller that feeds the recording material stacked on the tray to the conveyance belt;

a reverse roller that reverses the recording material onto which the toner image has been fixed by the fixing unit and conveys the recording material;

a conveyance roller that conveys the recording material conveyed by the reverse roller to the conveyance belt;

a motor that drives the reverse roller; and a processor that switches an image formation mode between a first mode in which a first photosensitive drum and a second photosensitive drum different from the first photosensitive drum among the plurality of the photosensitive drums are used to form the toner image, and a second mode in which the second photosensitive drum is used to form the toner image without using the first photosensitive drum, wherein the motor continuously drives the reverse roller while a toner image is formed on a first recording material fed by the feed roller and subsequently a toner image is formed on a second recording material that is different from the first recording material and conveyed by the conveyance roller, and in a case that the image formation mode for the first recording material is different from the image formation mode for the second recording material, the processor sets the image formation mode to the first mode while the toner images are formed on the first recording material and the second recording material.

22. The image forming apparatus according to claim 21, wherein the first mode is a full color mode for forming a color image, and the second mode is a black and white mode for forming a black and white image.

23. The image forming apparatus according to claim 21, wherein the motor drives the fixing unit and the reverse roller.

* * * * *